United States Patent
Smith

(10) Patent No.: US 9,069,152 B2
(45) Date of Patent: Jun. 30, 2015

(54) FURCATING FIBER OPTIC CABLES WITHOUT DIRECT COUPLING OF OPTICAL FIBERS TO STRENGTH MEMBERS, AND RELATED ASSEMBLIES AND METHODS

(71) Applicant: CORNING OPTICAL COMMUNICATIONS LLC, Hickory, NC (US)

(72) Inventor: Matthew Wade Smith, Lenoir, NC (US)

(73) Assignee: Corning Optical Communications LLC, Hickory, NC (US)

( * ) Notice: Subject to any disclaimer, the term of this patent is extended or adjusted under 35 U.S.C. 154(b) by 204 days.

(21) Appl. No.: 13/792,870

(22) Filed: Mar. 11, 2013

(65) Prior Publication Data

US 2014/0241676 A1    Aug. 28, 2014

Related U.S. Application Data

(60) Provisional application No. 61/770,692, filed on Feb. 28, 2013.

(51) Int. Cl.
G02B 6/44 (2006.01)

(52) U.S. Cl.
CPC ............ *G02B 6/4476* (2013.01); *G02B 6/4479* (2013.01); *G02B 6/4477* (2013.01)

(58) Field of Classification Search
None
See application file for complete search history.

(56) References Cited

U.S. PATENT DOCUMENTS

| | | | | |
|---|---|---|---|---|
| 4,626,067 A | * | 12/1986 | Watson | 385/86 |
| 4,989,945 A | * | 2/1991 | Ohkura | 385/39 |
| 5,473,718 A | | 12/1995 | Sommer | 385/87 |
| 5,943,462 A | * | 8/1999 | Schofield et al. | 385/100 |

FOREIGN PATENT DOCUMENTS

| | | | | |
|---|---|---|---|---|
| DE | 4341481 A1 | * | 6/1995 | G02B 6/44 |
| DE | 4423799 A1 | * | 1/1996 | G02B 6/44 |
| WO | WO 2012/094113 A2 | | 7/2012 | G02B 6/38 |
| WO | WO 2012/103162 A1 | | 8/2012 | G02B 6/44 |

* cited by examiner

*Primary Examiner* — Mike Stahl

(57) ABSTRACT

Furcating fiber optic cables without direct coupling of optical fibers to strength members are disclosed. Related methods and assemblies are also disclosed. The furcation includes shrink tube(s) securing optical fiber(s) to their fiber sub-unit jacket(s). The shrink tube(s) is secured inside a cable jacket of the fiber optic cable to secure fiber sub-unit(s) and their optical fiber(s) as part of the furcation. The strength member(s) of the fiber optic cable is also secured to the cable jacket as part of the furcation. The shrink tube(s) prevents direct coupling of the optical fiber(s) to the strength member(s) in the furcation. By not directly coupling the optical fiber(s) to the strength member(s), cable strain can be directed to the cable jacket and the fiber sub-unit jacket(s). The shrink tube(s) can also prevent or reduce micro-bubbles from forming around the optical fiber(s) in the furcation which may cause attenuation from optical fiber micro-bending.

27 Claims, 17 Drawing Sheets

FURCATING FIBER OPTIC CABLES WITHOUT DIRECT COUPLING OF OPTICAL FIBERS TO STRENGTH MEMBERS, AND RELATED ASSEMBLIES AND METHODS

RELATED APPLICATIONS

This application claims the benefit of priority under 35 U.S.C. §119 of U.S. Provisional Application Ser. No. 61/770,692 filed on Feb. 28, 2013, the content of which is relied upon and incorporated herein by reference in its entirety.

BACKGROUND

1. Field of the Disclosure

The field of the disclosure relates to fiber optic cable furcation assemblies for splitting-out optical fibers from a fiber optic cable for establishing fiber optic connections.

2. Technical Background

In telecommunication infrastructure installations, optical fiber is increasingly being used to establish communications connections. Benefits of optical fiber include high bandwidth and low power consumption to provide for efficient communications. Optical fibers can be provided in fiber optic cables. Fiber optic cables include a cable jacket surrounding the optical fibers for protection against environmental factors that can damage the optical fibers. The fiber optic cables can be pulled to fiber optic equipment during installation to establish optical connections. The fiber optic cables may include strength members within the cable jacket, such as aramid fiber, to resist bending forces on the cable jacket, which could otherwise damage the optical fibers. The fiber optic cables are furcated to separate or "break-out" individual optical fibers from the cable jacket of the fiber optic cable to establish optical connections between the optical fibers and fiber optic components contained in the fiber optic equipment.

In this regard, FIG. 1 illustrates a conventional furcation assembly 10 that provides a furcation of a fiber optic cable 12. When furcating a fiber optic cable 12 to create the furcation assembly 10, a process called "break-out" may be provided. The furcation assembly 10 secures the "broken-out" optical fibers 14(1)-14(8) to the cable jacket 18 and/or strength members 20. Break-out occurs at an end portion 26 of the fiber optic cable 12 where an end portion 16 of a cable jacket 18 of the fiber optic cable 12 is removed. The furcation assembly 10 can also be installed on fiber optic equipment to secure the fiber optic cable 12 to the fiber optic equipment to prevent forces on the fiber optic cable 12 from pulling on the "broken out" optical fibers 14(1)-14(8).

With continuing reference to FIG. 1, the furcation assembly 10 includes a furcation body 22 serving as a protective enclosure for the optical fibers 14(1)-14(8). The optical fibers 14(1)-14(8) are bonded inside the furcation body 22 with a potting compound 24, which may be an epoxy. During the furcating process, the "broken out" optical fibers 14(1)-14(8) are inserted through the furcation body 22 so that an end 27 of the cable jacket 18, a portion of the optical fibers 14(1)-14(8) adjacent to the end 27 of the cable jacket 18, and a portion of the strength members 20 adjacent to the end 27 of the cable jacket 18 are disposed within the furcation body 22. The potting compound 24 is disposed in the furcation body 22 to secure the optical fibers 14(1)-14(8) to the strength member 20, the cable jacket 18, and furcation body 22. A seal 28 is applied to the furcation body 22 to prevent the potting compound 24 from escaping out at a bottom 30 of the furcation body 22 where the cable jacket 18 extends out of the furcation body 22. When the potting compound 24 is cured, the optical fibers 14(1)-14(8), the cable jacket 18, and strength members 20 are secured together inside the furcation body 22 via the potting compound 24. The furcation body 22 may then be pulled and/or installed in fiber optic equipment where the optical fibers 14(1)-14(8) are terminated. The furcation body 22 may be then secured to the fiber optic equipment. In this manner, forces on the fiber optic cable 12 may be directed to fiber optic equipment (not shown) instead of the optical fibers 14(1)-14(8).

Furcating a fiber optic cable 12 by use of the potting compound 24 in the furcation body 22 may result in certain issues related to manufacturing and installation. For example, small air bubbles (also called "microbubbles") may form in the potting compound 24 adjacent to the optical fibers 14(1)-14(8) within the furcation body 22. The air bubbles may cause microbends in the adjacent optical fibers 14(1)-14(8) resulting in signal attenuation as the air bubbles change size with temperature and humidity. The potting compound 24 used in combination with a small interior space of the furcation body 22 may also make it difficult to control and monitor the relationship between the strength members 20 and the optical fibers 14(1)-14(8) bonded together at the furcation assembly 10. As a result, the cable forces from the strength members 20 may propagate to the optical fibers 14(1)-14(8) held taut by the potting compound 24 where damage and/or attenuation may occur. Also, if the furcation body 22 has a larger outer diameter than the cable jacket 18, the furcation body 22 is not easily pulled through increasingly smaller conduits at installation sites, and furcation alternatives that are more easily pulled would be desirable.

SUMMARY OF THE DETAILED DESCRIPTION

Embodiments disclosed herein include furcating fiber optic cables without direct coupling of optical fibers to strength members. Related methods and assemblies are also disclosed. A furcation is formed on a fiber optic cable comprised of a cable jacket surrounding strength member(s) and fiber sub-unit(s) each containing optical fiber(s). The fiber optic cable furcation "breaks-out" the optical fiber sub-units from the cable jacket so that optical connections may be established. The furcation also secures component(s) of the cable to the strength member(s) to carry cable strain. The furcation includes a shrink tube(s) to secure optical fiber(s) to their fiber sub-unit jacket(s). The shrink tube(s) is secured inside the cable jacket to secure fiber sub-unit(s) and their optical fiber(s) as part of the furcation. The strength members(s) of the fiber optic cable is also secured to the cable jacket of the fiber optic cable as part of the furcation. The shrink tube(s) prevents the optical fiber(s) of the fiber sub-unit(s) from being directly coupled to the strength member(s) in the furcation. By not directly coupling the optical fibers to the strength member(s), cable strain can be directed to the cable jacket and the fiber sub-unit jacket(s). The shrink tube(s) can also prevent or reduce micro-bubbles forming around the optical fiber(s) in the furcation that may cause optical attenuation from micro-bending occurring in the optical fiber(s).

In this regard, in one embodiment, a method of furcating a fiber optic cable is provided. The method comprises exposing an end portion of at least one fiber sub-unit and an end portion of at least one strength member from a cable jacket of a fiber optic cable. The method also comprises exposing an end portion of at least one optical fiber from an end portion of at least one fiber sub-unit jacket of the at least one fiber sub-unit. The method also comprises securing the end portion of the at least one optical fiber to the at least one fiber sub-unit jacket with at least one shrink tube. The method also comprises securing the at least one shrink tube securing the at least one optical fiber to the at least one fiber sub-unit jacket, and the at least one strength member to the cable jacket with at least one coupling member to furcate the fiber optic cable without direct coupling of the at least one strength member to the at least one optical fiber. In this manner, the fiber optic cable furcation may direct cable strain to the cable jacket instead of to the at least one optical fiber.

In another embodiment, a fiber optic cable furcation assembly is provided. The fiber optic cable furcation assembly comprises a fiber optic cable. The fiber optic cable comprises a cable jacket, at least one strength member, and an end portion of at least one fiber sub-unit. The end portion of the at least one fiber sub-unit comprises an end portion of at least one optical fiber extending from at least one fiber sub-unit jacket of the at least one fiber sub-unit. The fiber optic cable furcation assembly also comprises a furcation provided on an end portion of the fiber optic cable. The furcation comprises at least one shrink tube securing the end portion of the at least one optical fiber to the at least one fiber sub-unit jacket. The furcation also comprises at least one coupling member securing the at least one shrink tube securing the at least one optical fiber to the at least one fiber sub-unit jacket, and the at least one strength member to the cable jacket to establish the furcation of the fiber optic cable without direct coupling of the at least one strength member to the at least one optical fiber. In this manner, the fiber optic cable furcation may be easily pulled through conduits located at installation locations.

In another embodiment a fiber optic cable furcation assembly is provided. The fiber optic cable furcation assembly comprises a fiber optic cable. The fiber optic cable comprises a cable jacket, at least one strength member, and an end portion of at least one fiber sub-unit. The end portion of the at least one fiber sub-unit comprises an end portion of at least one optical fiber extending from at least one fiber sub-unit jacket of the at least one fiber sub-unit. The fiber optic cable furcation assembly further comprises a furcation provided on an end portion of the fiber optic cable. The furcation comprises at least one shrink tube securing the end portion of the at least one optical fiber to the at least one fiber sub-unit jacket. The furcation also comprises at least one fan-out tube disposed at least partially around the at least one optical fiber and abutting against the at least one shrink tube. The furcation also comprises at least one coupling member securing the at least one fan-out tube, the at least one shrink tube securing the at least one optical fiber to the at least one fiber sub-unit jacket, and the at least one strength member to the cable jacket to establish the furcation of the fiber optic cable without direct coupling of the at least one strength member to the at least one optical fiber. The at least one coupling member is comprised of a hot melt adhesive. In this manner, micro-bubbles may be eliminated or reduced at the furcation to reduce attenuation.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 8I-1 is a longitudinal side view of the partially assembled fiber optic cable furcation assembly of FIG. 8H illustrating the outer shrink tube being disposed over the fan-out tubes and the cable jacket, and heat being applied to the at least one outer shrink tube to secure the outer shrink tube to the fan-out tubes and the cable jacket;

FIG. 8I-2 is a side view of another exemplary fiber optic cable furcation assembly illustrating the strength members exiting from the split cut in the cable jacket and the outer shrink tube secured around the partially assembled fiber optic cable furcation of FIG. 8H;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include furcating fiber optic cables without direct coupling of optical fibers to strength members. Related methods and assemblies are also disclosed. A furcation is formed on a fiber optic cable comprised of a cable jacket surrounding strength member(s) and fiber sub-unit(s) each containing optical fiber(s). The fiber optic cable furcation "breaks-out" the optical fiber sub-units from the cable jacket so that optical connections may be established. The furcation also secures component(s) of the cable to the strength member(s) to carry cable strain. The furcation includes a shrink tube(s) to secure the optical fiber(s) to their fiber sub-unit jacket(s). The shrink tube(s) is secured inside the cable jacket to secure fiber sub-unit(s) and their optical fiber(s) as part of the furcation. The strength members(s) of the fiber optic cable is also secured to the cable jacket of the fiber optic cable as part of the furcation. The shrink tube(s) prevents the optical fiber(s) of the fiber sub-unit(s) from being directly coupled to the strength member(s) in the furcation. By not directly coupling the optical fibers to the strength member(s), cable strain can be directed to the cable jacket and the fiber sub-unit jacket(s). The shrink tube(s) can also prevent or reduce micro-bubbles forming around the optical fiber(s) in the furcation that may cause optical attenuation from micro-bending occurring in the optical fiber(s).

Figure 2A:
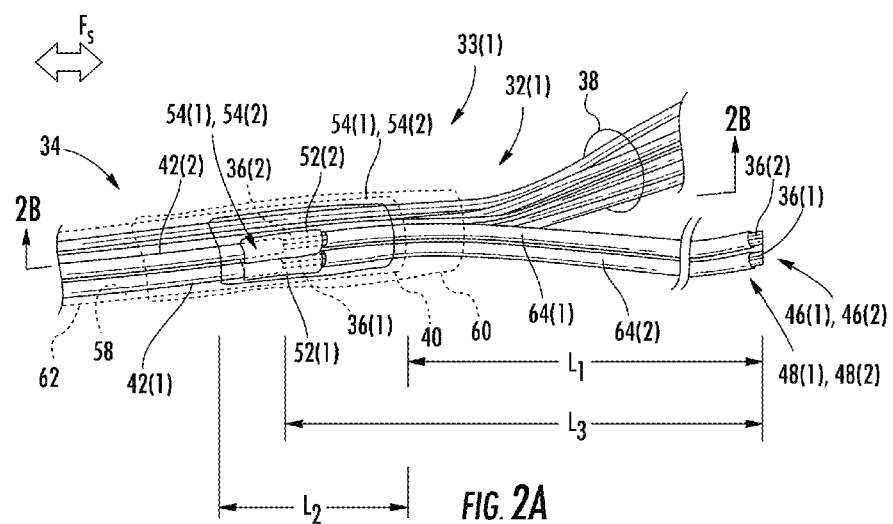
FIG. 2A is a longitudinal side view of an exemplary fiber optic cable furcation assembly including optical fibers of fiber sub-units of a fiber optic cable secured to fiber sub-unit jackets of the fiber sub-units with shrink tubes without direct coupling of the optical fibers to strength members.
Figure 2B:
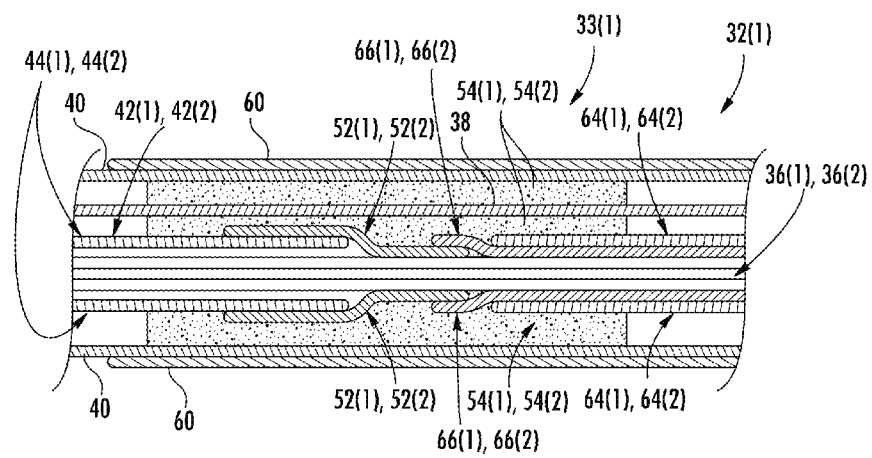
FIG. 2B a sectional close-up view of the fiber optic cable furcation of FIG. 2A illustrating the coupling member and one of the shrink tubes.

In this regard, FIGS. 2A and 2B are a longitudinal side view and a sectional close-up view, respectively, of an exemplary fiber optic cable furcation assembly 32(1) for a fiber optic cable 34 comprising a fiber optic cable 34 and a furcation 33(1). As will be discussed in more detail below, the optical fibers 36(1), 36(2) of the fiber optic cable 34 are secured in the fiber optic cable furcation assembly 32(1) without direct coupling of the optical fibers 36(1), 36(2) to the strength member 38 of the fiber optic cable 34. The fiber optic cable 34 on which the fiber optic cable furcation assembly 32(1) is formed includes a cable jacket 40 and at least one fiber sub-unit 42(1), 42(2) at least partially disposed within the cable jacket 40. The fiber sub-units 42(1), 42(2) comprise at least one fiber sub-unit jacket 44(1), 44(2) and the optical fibers 36(1), 36(2) at least partially disposed within the fiber sub-unit jackets 44(1), 44(2). The cable jacket 40 protects the contents of the fiber optic cable 34 from environmental factors and the fiber sub-unit jackets 44(1), 44(2) resist bending and thereby protect the optical fibers 36(1), 36(2) from bends and kinks within the cable jacket 40.

With continuing reference to FIGS. 2A and 2B, the fiber optic cable furcation assembly 32(1) serves to break-out the individual ones of the optical fibers 36(1), 36(2) so that optical connections may be established. The cable jacket 40 may be stripped a distance $L_1$ and then split a distance $L_2$ to collectively expose at least one end portion 46(1), 46(2) of the fiber sub-units 42(1), 42(2) from the cable jacket 40. Also, the fiber sub-unit jackets 44(1), 44(2) may be stripped a distance $L_3$ to expose at least one end portion 48(1), 48(2) of the optical fibers 36(1), 36(2). Thereby the end portion 46(1), 46(2) of the fiber sub-units 42(1), 42(2) comprises the end portion 48(1), 48(2) of the optical fibers 36(1), 36(2) extending from the fiber sub-unit jackets 44(1), 44(2) of the fiber sub-units 42(1), 42(2). In this manner, the individual ones of the optical fibers 36(1), 36(2) may break-out of the cable jacket 40 of the fiber optic cable 34 to be individually connected.

With continuing reference to FIGS. 2A and 2B, the fiber optic cable furcation assembly 32(1) also serves to protect the optical fibers 36(1), 36(2) from cable strain $F_S$ as they extend from the cable jacket 40 by attaching various components of the fiber optic cable 34 together. In this manner, if one or more components of the fiber optic cable 34 may be subjected to the cable strain $F_S$, then the cable strain $F_S$ may be collectively conveyed to the strength member 38 of the fiber optic cable 34 at the fiber optic cable furcation assembly 32(1) and directed to fiber optic equipment 50 attached to the strength member 38. By directing the cable strain to the fiber optic equipment 50 (FIG. 3), the fiber optic cable furcation assembly 32(1) prevents the cable strain $F_S$ from propagating to the individual ones of the optical fibers 36(1), 36(2) where damage or attenuation may occur.

In order to secure the various components of the fiber optic cable 34 together, the furcation 33(1) of the fiber optic cable furcation assembly 32(1) comprises at least one shrink tube 52(1), 52(2) and at least one coupling member 54(1), 54(2). The shrink tubes 52(1), 52(2) enable the optical fibers 36(1), 36(2) to be secured within the fiber optic cable furcation assembly 32(1) without direct coupling to the strength member 38. Specifically, the shrink tubes 52(1), 52(2) secure the optical fibers 36(1), 36(2) to the fiber sub-unit jackets 44(1), 44(2). The fiber sub-unit jackets 44(1), 44(2) provide the securing required to keep the optical fibers 36(1), 36(2) secured at the furcation 33(1) to prevent cable strain from propagating along the optical fibers 36(1), 36(2) as they exit the cable jacket 40. By not directly coupling the optical fibers 36(1), 36(2) to the strength member 38, cable strain can be directed to the cable jacket 40 and the fiber sub-unit jackets 44(1), 44(2).

The shrink tubes 52(1), 52(2) may use a mechanical lock (or friction) to be secured to the fiber sub-unit jackets 44(1), 44(2) and the optical fibers 36(1), 36(2). To supplement the mechanical lock (or friction) and with continued reference to FIGS. 2A and 2B, the shrink tubes 52(1), 52(2) may include one or more adhesive and/or cohesive materials to form chemical adhesive or cohesive bonds with the fiber sub-unit jackets 44(1), 44(2) and the optical fibers 36(1), 36(2). In this manner, the fiber sub-unit jackets 44(1), 44(2) may be secured to the optical fibers 36(1), 36(2).

Moreover, securing of the fiber sub-unit jackets 44(1), 44(2) to the optical fibers 36(1), 36(2) makes possible precise disposition of extra fiber length (EFL) 56(1), 56(2) of the optical fibers 36(1), 36(2), respectively, within the fiber sub-unit jackets 44(1), 44(2). The EFL 56(1), 56(2) protects against damage to the optical fibers 36(1), 36(2) so that when the fiber optic cable 34 is subject to tension from the cable strain $F_S$, the EFL 56(1), 56(2) may provide extra slack to reduce potentially damaging tension on the optical fibers 36(1), 36(2).

With continued reference to FIGS. 2A and 2B, it is also noted that securing the fiber sub-unit jackets 44(1), 44(2) to the optical fibers 36(1), 36(2) may also reduce or eliminate attenuation-causing micro-bends in the optical fibers 36(1), 36(2) as a result of micro-bubbles. The strength members 38 and the coupling members 54(1), 54(2) are not directly coupled to the optical fibers 36(1), 36(2), because the optical fibers 36(1), 36(2) are instead secured to the fiber sub-unit jackets 44(1), 44(2). The strength members 38 have been identified as a source of micro-bubbles when encapsulated within potting compounds because air sometimes is trapped at the surface of the strength members 38. When the micro-bubbles are located in close proximity to the optical fibers 36(1), 36(2) the micro-bubbles may become attenuation-causing, because the micro-bubbles push and pull on the optical fibers 36(1), 36(2) causing micro-bends in the optical fibers 36(1), 36(2) with changes in temperature. By securing the optical fibers 36(1), 36(2) to the fiber sub-unit jackets 44(1), 44(2) instead of to the strength members 38 via the coupling members 54(1), 54(2), the optical fibers 36(1), 36(2) can be better isolated from the sources of micro-bubbles and thus attenuation from micro-bends may be reduced.

With continued reference to FIGS. 2A and 2B, the coupling members 54(1), 54(2) of the fiber optic cable furcation assembly 32(1) also serve to attach various components of the fiber optic cable 34 within the fiber optic cable furcation assembly 32(1). The coupling members 54(1), 54(2) secure the shrink tubes 52(1), 52(2) to an inner surface 58 of the cable jacket 40 of the fiber optic cable 34. The coupling members 54(1), 54(2) may include one or more adhesive and/or cohesive materials to form chemical adhesion or cohesion between the inner surface 58 of the cable jacket 40 and the shrink tubes 52(1), 52(2). The coupling members 54(1), 54(2) may also couple the strength member 38 of the fiber optic cable 34 to the inner surface 58 of the cable jacket 40. In this manner, the shrink tubes 52(1), 52(2) may secure the optical fibers 36(1), 36(2) to the fiber sub-unit jackets 44(1), 44(2) instead of coupling the optical fibers 36(1), 36(2) to the strength member 38 with the coupling members 54(1), 54(2). Accordingly, attenuation-causing micro-bubbles may be avoided adjacent to the optical fibers 36(1), 36(2).

In order to add structural strength to the fiber optic cable furcation assembly 32(1), the fiber optic cable furcation assembly 32(1) may also include at least one outer shrink tube 60 secured around the cable jacket 40 and the shrink tubes 52(1), 52(2). The outer shrink tube 60 may use a mechanical lock, friction, cohesive bond, and/or adhesive bond to be secured to an outer surface 62 of the cable jacket 40. The outer shrink tube 60 may supplement the protective function of the cable jacket 40 at the fiber optic cable furcation assembly 32(1).

The optical fibers 36(1), 36(2) may need protection from environmental factors as they extend away from the cable jacket 40. To provide protection, the fiber optic cable furcation assembly 32(1) may also include at least one fan-out tube 64(1), 64(2) at least partially disposed around the end portions 48(1), 48(2) of the optical fibers 36(1), 36(2). The fan-out tubes 64(1), 64(2) may also be disposed adjacent to the shrink tubes 52(1), 52(2) to provide protection from cable strain, temperature, and humidity beginning from the shrink tubes 52(1), 52(2) and extending out from the cable jacket 40. The fan-out tubes 64(1), 64(2) may also, by being adjacently located to the shrink tubes 52(1), 52(2), prevent the optical fibers 36(1), 36(2) from being exposed to the strength member 38, so the strength member 38 is not directly coupled to the optical fibers 36(1), 36(2) at the furcation 33(1).

The fiber optic cable furcation assembly 32(1) may include means to secure the fan-out tubes 64(1), 64(2) to the other components of the fiber optic cable furcation assembly 32(1). The coupling members 54(1), 54(2) may secure the fan-out tubes 64(1), 64(2) to the cable jacket 40. The outer shrink tube 60 may also secure the fan-out tubes 64(1), 64(2) to the cable jacket 40.

The optical fibers 36(1), 36(2) may need protection from tension as they extend from the cable jacket 40. At least one fan-out tube strength member 66(1), 66(2) may be included as part of the fan-out tubes 64(1), 64(2) of the fiber optic cable furcation assembly 32(1). The fan-out tube strength members 66(1), 66(2) may be secured to the cable jacket with the coupling members 54(1), 54(2). In this manner, the optical fibers 36(1), 36(2) extending from the cable jacket may be protected by the fiber optic cable furcation assembly 32(1).

In summary, the fiber optic cable furcation assembly 32(1) depicted in FIGS. 2A and 2B comprises the fiber optic cable 34 and the furcation 33(1) for breaking out the optical fibers 36(1), 36(2) from the cable jacket 40 so they may be independently terminated to establish fiber optic connections. The furcation 33(1) comprises the shrink tubes 52(1), 52(2) and the coupling members 54(1), 54(2). The shrink tubes 52(1), 52(2) secure the optical fibers 36(1), 36(2) to their fiber sub-unit jackets 44(1), 44(2). The shrink tubes 52(1), 52(2) are also secured to the cable jacket 40 of the fiber optic cable 34 as part of the furcation 33(1). By not directly coupling the optical fibers 36(1), 36(2) to the strength member 38, cable strain can be directed to the cable jacket 40 and the fiber sub-unit jackets 44(1), 44(2). The shrink tubes 52(1), 52(2) can also prevent or reduce micro-bubbles forming around the optical fibers 36(1), 36(2) in the furcation 33(1) that may cause optical attenuation from micro-bending occurring in the optical fibers 36(1), 36(2).

Figure 3:
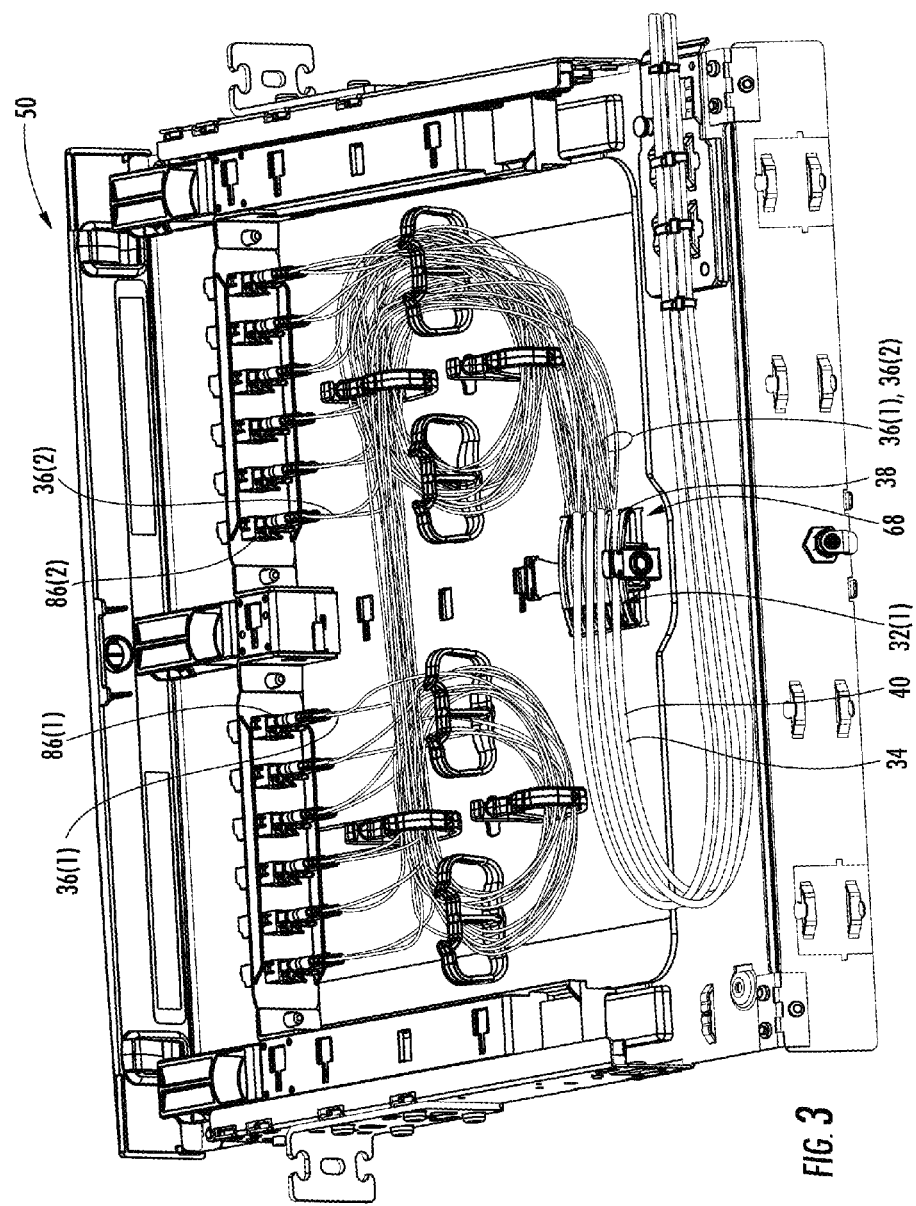
FIG. 3 is a top perspective view of the fiber optic cable furcation assembly of FIG. 2B installed in an exemplary fiber optic equipment.

The fiber optic cable furcation assembly 32(1) formed on the fiber optic cable 34 can be secured to fiber optic equipment 50 to direct cable strain $F_S$ away from the optical fibers as they extend from the cable jacket 40. In this regard, FIG. 3 is a top perspective view of the fiber optic cable 34 including the fiber optic cable furcation assembly 32(1) of FIG. 2A installed on exemplary fiber optic equipment 50. The fiber optic cable furcation assembly 32(1) may be attached to the fiber optic equipment 50 using the strength member 38 secured to a portion 68 of the fiber optic equipment 50 with, for example, a fastener (not shown). The fiber optic cable furcation assembly 32(1) may allow optical fibers 36(1), 36(2) to exit the cable jacket 40 at the fiber optic cable furcation assembly 32(1) and terminate independently.

It is noted that the strength member 38 is the preferred cable strain bearing component within the fiber optic cable 34. The strength member 38 comprises a strong tensile-resistant material, for example, a para-aramid synthetic fiber. By placing the cable jacket 40 in abutment with the coupling members 54(1), 54(2) and the strength member 38, a more effective bond may be formed with the cable jacket 40 to direct cable strain to the cable jacket 40 and away from the optical fibers 36(1), 36(2).

Figure 4:
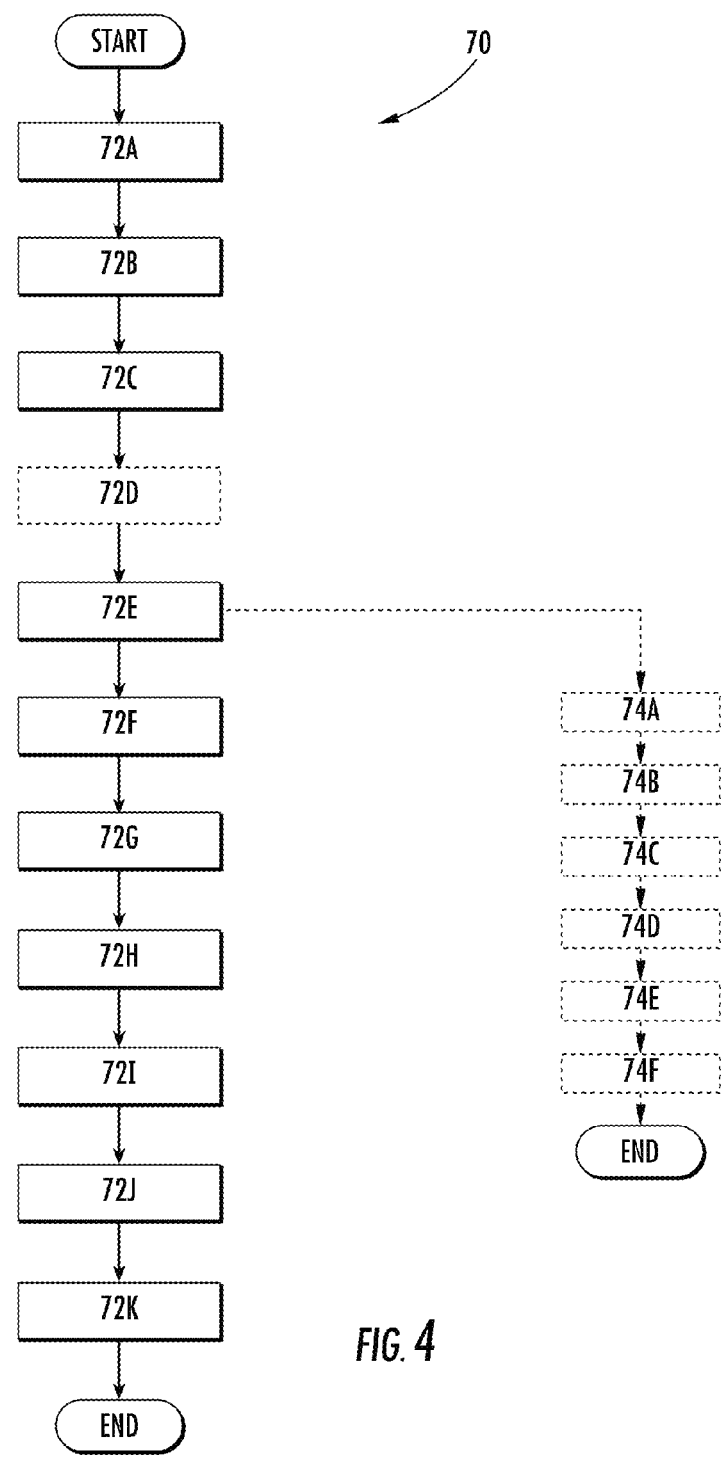
FIG. 4 is a flowchart diagram of an exemplary process for furcating an end portion of a fiber optic cable without direct coupling of the optical fibers to strength members.

Now that the fiber optic cable furcation assembly 32(1) has been introduced above, an exemplary process 70 to furcate the fiber optic cable 34 will be discussed below where the optical fibers 36(1), 36(2) of the fiber optic cable 34 are secured in the fiber optic cable furcation assembly 32(1) without direct coupling of the optical fibers 36(1), 36(2) to the strength member 38 of the fiber optic cable 34. In this regard, FIG. 4 provides a flowchart diagram illustrating an exemplary process 70 that may be employed to furcate the fiber optic cable 34. The flowchart diagram includes blocks 72A-72K to describe the exemplary process 70, and blocks 74A-74F are included to describe an optional embodiment. Blocks which are optional are depicted in broken lines for convenient reference. The terminology and reference characters introduced above will be utilized in the related discussion below for continuity, clarity and conciseness.

Figure 5A:
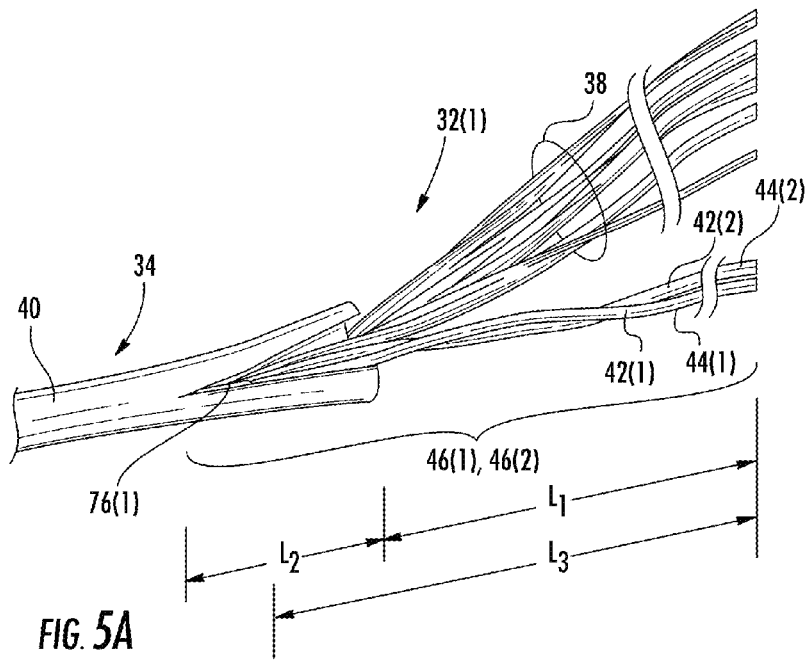
FIG. 5A is a side longitudinal view of the cable jacket of the fiber optic cable of FIG. 2B cut and split to expose an end portion of the fiber sub-units from the cable jacket to form the fiber optic cable furcation of FIG. 2A.

FIG. 5A is a side longitudinal view of the fiber optic cable 34 provided at the beginning of the exemplary process 70 (Block 72A of FIG. 4). The cable jacket 40 may be stripped the distance $L_1$ and then split the distance $L_2$ with at least one split cut 76(1) to collectively expose the end portions 46(1), 46(2) of the fiber sub-units 42(1), 42(2), respectively, from the cable jacket 40. The distance $L_2$ may be, for example, 1.5 inches to provide sufficient access to the components inside the fiber optic cable 34 to form the fiber optic cable furcation assembly 32(1). Exposing the end portions 46(1), 46(2) enables further processing steps to be applied to the fiber sub-units 42(1), 42(2) to prepare the fiber optic cable 34 for furcation.

It is noted that the cable jacket 40 may be cylindrically shaped and made of a strong material to protect contents of the fiber optic cable 34. The strong material may comprise, for example, ultra-violet (UV) curable acrylate. The cable jacket 40 may also be flexible to better permit the fiber optic cable 34 to bend and thereby be pulled through conduits during installation.

Figure 5B:
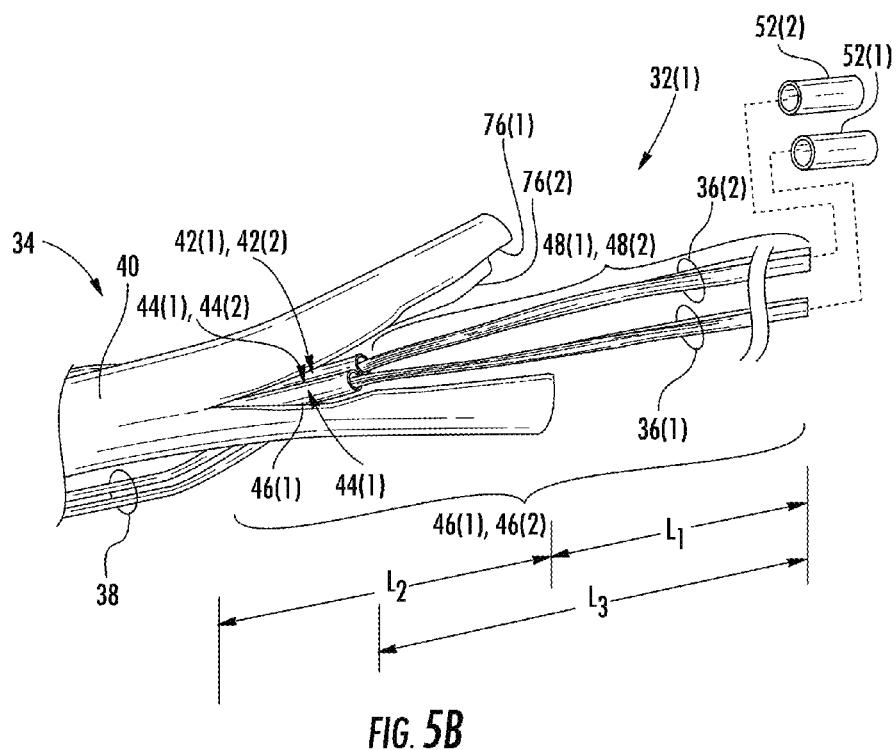
FIG. 5B is a side longitudinal view of the partially assembled fiber optic cable furcation assembly of FIG. 5A illustrating the optical fibers being exposed from sub-unit jackets and shrink tubes provided, but detached, for later assembly.

FIG. 5B is a side longitudinal view of the partially assembled fiber optic cable furcation assembly 32(1) illustrating exposing the end portions 48(1), 48(2) of the optical fibers 36(1), 36(2) from the end portions 46(1), 46(2) of the fiber sub-units 42(1), 42(2) (Block 72B of FIG. 4). The exposing the end portions 48(1), 48(2) may include stripping the fiber sub-unit jackets 44(1), 44(2) from the optical fibers 36(1), 36(2) using at least one stripping tool, for example, a sheath knife. Once exposed, the optical fibers 36(1), 36(2) may be cleaned with a clean cloth (not shown) that may be dampened with isopropyl alcohol to remove loose debris. In this manner, the optical fibers 36(1), 36(2) may be prepared for securing to the fiber sub-unit jackets 44(1), 44(2) with the shrink tubes 52(1), 52(2). It is noted that the cable jacket 40 is shown with the split cuts 76(1), 76(2) opposite to each other and orientated longitudinally to gain better access to the fiber sub-units 42(1), 42(2).

It is noted that the fiber sub-unit jackets 44(1), 44(2) are cylindrically-shaped to allow the optical fibers 36(1), 36(2) to be disposed therein for protection. The fiber sub-unit jackets 44(1), 44(2) may comprise a strong, rigid material, for example, polypropylene to provide protection for the optical fibers 36(1), 36(2) against cable strain and bending. The fiber sub-unit jackets 44(1), 44(2) may each contain one or more of the optical fibers 36(1), 36(2) and may also contain strong material therein, for example, aramid fiber to direct tension applied to the fiber sub-unit away from the optical fibers 36(1), 36(2).

Figure 5C:
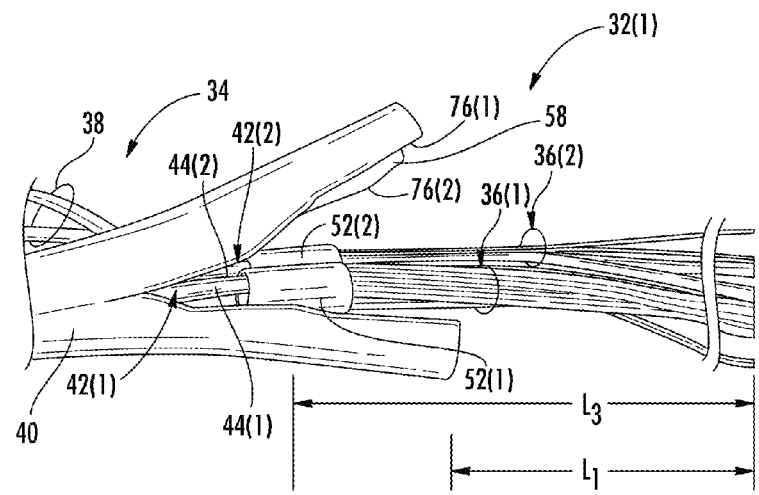
FIG. 5C is a longitudinal side view of the partially assembled fiber optic cable furcation assembly of FIG. 5B, with at least shrink tubes each disposed around the fiber sub-unit jackets and the optical fibers, to secure the optical fibers to the fiber sub-unit jackets without direct coupling to the strength member of the fiber optic cable.
Figure 5D:
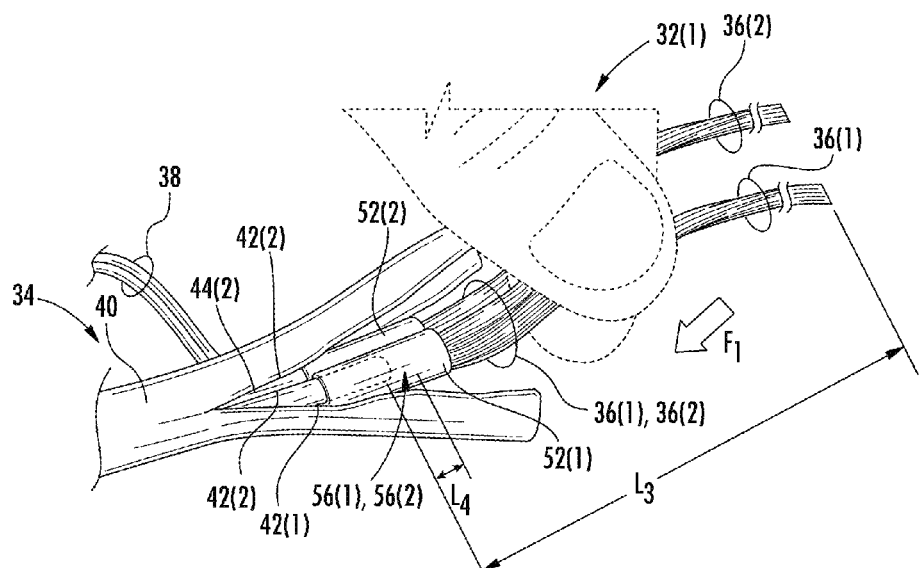
FIG. 5D is a longitudinal side view of the partially assembled fiber optic cable furcation assembly of FIG. 5C illustrating extra fiber length (EFL) of the optical fibers being pushed back into the fiber sub-unit jackets.
Figure 5E:
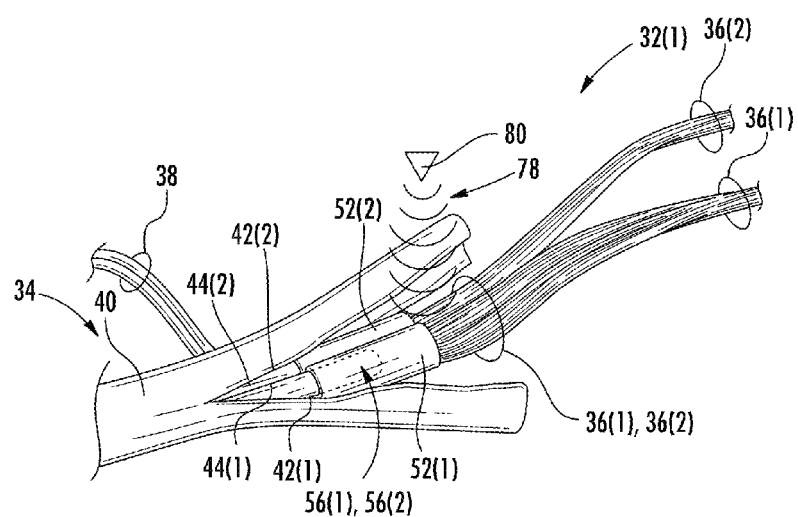
FIG. 5E is a longitudinal side view of the partially assembled fiber optic cable furcation assembly of FIG. 5D depicting the optical fibers being secured to the fiber sub-unit jackets by exposing the shrink tubes to heat energy.

FIGS. 5C-5E depict the optical fibers 36(1), 36(2) being secured to the fiber sub-unit jackets 44(1), 44(2) with the shrink tubes 52(1), 52(2). In this manner, the optical fibers 36(1), 36(2) may be free of direct coupling to the strength member 38 which would otherwise subject to the optical fibers 36(1), 36(2) to the coupling members 54(1), 54(2) and associated micro-bubbles which may cause attenuation. In this regard, FIG. 5C is a longitudinal side view of the partially assembled fiber optic cable furcation assembly 32(1) of FIG. 5B with the shrink tubes 52(1), 52(2) disposed around the fiber sub-unit jackets 44(1), 44(2) and the optical fibers 36(1), 36(2) (Block 72C of FIG. 4). Once the shrink tubes 52(1), 52(2) disposed or positioned around the fiber sub-unit jackets 44(1), 44(2) and the optical fibers 36(1), 36(2) then the shrink tubes 52(1), 52(2) may be secured. In an exemplary embodiment, each of the shrink tubes 52(1), 52(2) may be one (1) inch long. Half of a length of the shrink tubes 52(1), 52(2) may be abut against the fiber sub-unit jackets 44(1), 44(2), respectively, and another half of the length may abut against the optical fibers 36(1), 36(2), respectively.

Before securing the shrink tubes 52(1), 52(2), the extra fiber length 56 ("EFL") may optionally be disposed within the fiber sub-unit jackets 44(1), 44(2) to protect the optical fibers 36(1), 36(2) from cable strain prior to securing the shrink tubes 52(1), 52(2) (Block 72D of FIG. 4). FIG. 5D is a side view of the partially assembled fiber optic cable furcation assembly of FIG. 5C wherein the EFL 56 of the optical fibers 36(1), 36(2) may be disposed within the fiber sub-unit jackets 44(1), 44(2). Specifically, the EFL 56 may be created by pushing a distance $L_4$ of the optical fibers 36(1), 36(2) with force $F_1$ into the fiber sub-unit jackets 44(1), 44(2). As a result, the EFL 56(1), 56(2), or alternatively called "portions of the optical fibers 36(1), 36(2)," are formed free from tension and located within the fiber sub-unit jackets 44(1), 44(2) and adjacent to the shrink tubes 52(1), 52(2). The distance $L_4$ may be, for example, a one-quarter (0.25) inches. The EFL 56 enables tension from the cable strain $F_S$ (FIG. 2A) to be directed to the strength member 38 and thereby avoiding placing the tension on the optical fibers 36(1), 36(2) which may cause attenuation.

FIG. 5E is a longitudinal side view of the partially assembled fiber optic cable furcation assembly 32(1) of either FIG. 5C or 5D depicting the optical fibers 36(1), 36(2) being secured to the fiber sub-unit jackets 44(1), 44(2) (Block 72E of FIG. 4). The securing may be accomplished by exposing the shrink tubes 52(1), 52(2) to heat energy 78 from a heat source 80, for example, hot air from a hot air device. The shrink tubes 52(1), 52(2) may constrict in a process called "heat shrinking" to a smaller diameter as the heat energy 78 may be absorbed to thereby secure the shrink tubes 52(1), 52(2) to the fiber sub-unit jackets 44(1), 44(2) and the optical fibers 36(1), 36(2). The shrink tube 52(1), 52(2) may, for example, comprise polyolefin and an adhesive to more securely attach the shrink tube 52(1), 52(2) to the fiber sub-units 42(1), 42(2) and the optical fibers 36(1), 36(2). Now that the optical fibers 36(1), 36(2) are secured to the fiber sub-unit jackets 44(1), 44(2), direct coupling to the strength members 38 with the coupling members 54(1), 54(2) is unnecessary, because coupling to the strength members 38 may be accomplished through the shrink tubes 52(1), 52(2) or the fiber sub-unit jackets 44(1), 44(2).

Figure 5F:
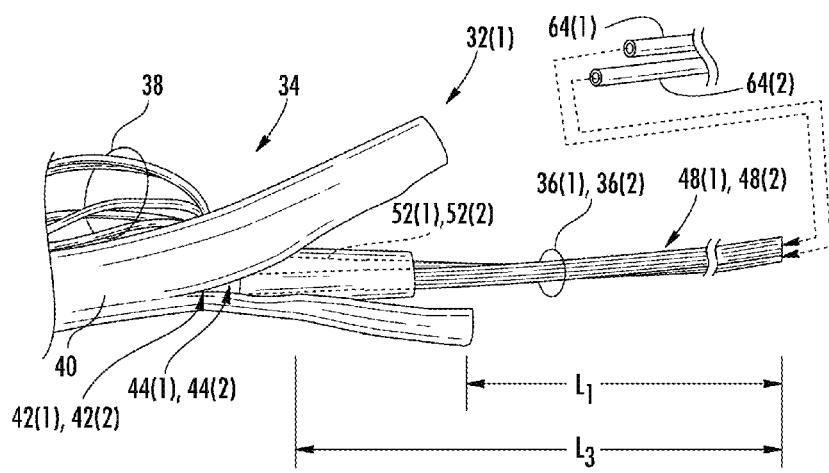
FIGS. 5F and 5G are longitudinal side views of the partially assembled fiber optic cable furcation assembly of FIG. 5E with at least one fan-out tube being at least partially disposed around an end portion of the optical fibers and adjacent to the shrink tubes.
Figure 5G:
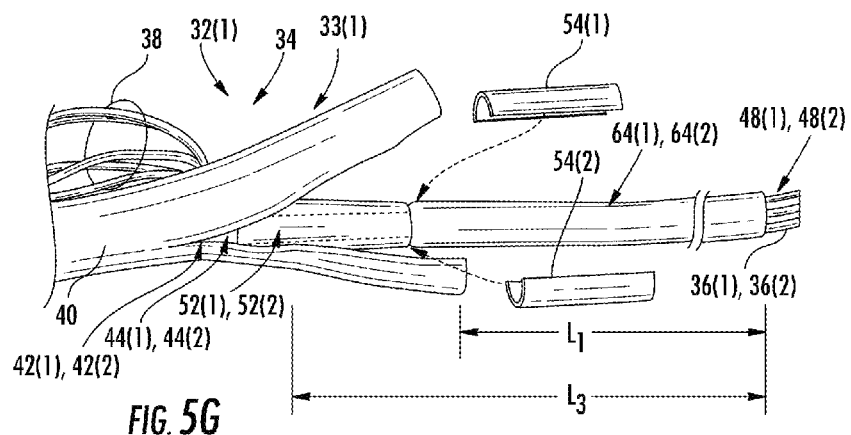

As discussed above, the fan-out tubes 64(1), 64(2) protect the optical fibers 36(1), 36(2) as they extend from the cable jacket 40. FIGS. 5F and 5G are longitudinal side views of the partially assembled fiber optic cable furcation assembly 32(1) of FIG. 5E with the fan-out tubes 64(1), 64(2) being at least partially disposed around the end portions 48(1), 48(2) of the optical fibers 36(1), 36(2) and adjacent to the shrink tubes 52(1), 52(2) (Block 72F of FIG. 4). The adjacent proximity of the fan-out tubes 64(1), 64(2) to the shrink tubes 52(1), 52(2) may prevent direct coupling of the optical fibers 36(1), 36(2) to the strength member 38 by preventing the coupling members 54(1), 54(2) and the strength member 38 from contacting the optical fibers 36(1), 36(2).

Figure 5H:
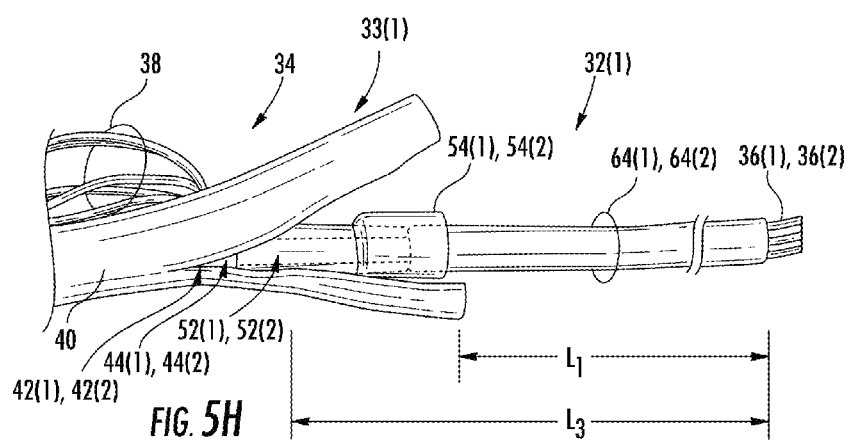
FIG. 5H is a longitudinal side view of the partially assembled fiber optic cable furcation assembly of FIG. 5G with the coupling members disposed adjacent to the shrink tubes.

Several blocks are to be completed before the coupling members 54(1), 54(2) may secure components of the fiber optic cable furcation assembly 32(1). FIG. 5H is a longitudinal side view of the partially assembled fiber optic cable furcation assembly 32(1) of FIG. 5G with the coupling members 54(1), 54(2) provided in FIG. 5G disposed adjacent to the shrink tubes 52(1), 52(2) (Block 72G of FIG. 4). The adjacent proximity of the coupling members 54(1), 54(2) to the shrink tubes 52(1), 52(2) enables the shrink tubes 52(1), 52(1) to be secured to the cable jacket 40 with the coupling members 54(1), 54(2). The coupling members 54(1), 54(2) may also be disposed adjacent to the fan-out tubes 64(1), 64(1) for secure the fan-out tubes 64(1), 64(1) to the cable jacket 40.

The coupling members 54(1), 54(2) may comprise a strong material capable of establishing reliable bonds with various disparate materials. Consistent with these characteristics, the coupling members 54(1), 54(2) may be comprised of a hot melt adhesive comprising thermoplastic in a form of at least one solid glue member that may be disposed about the fiber sub-units 42(1), 42(2). In an exemplary embodiment, the coupling members 54(1), 54(2), may be, for example, a ThermoGrip® HM7116 hot melt adhesive made by Bostik, Inc. of Wauwatosa, Wis.

Figure 5I:
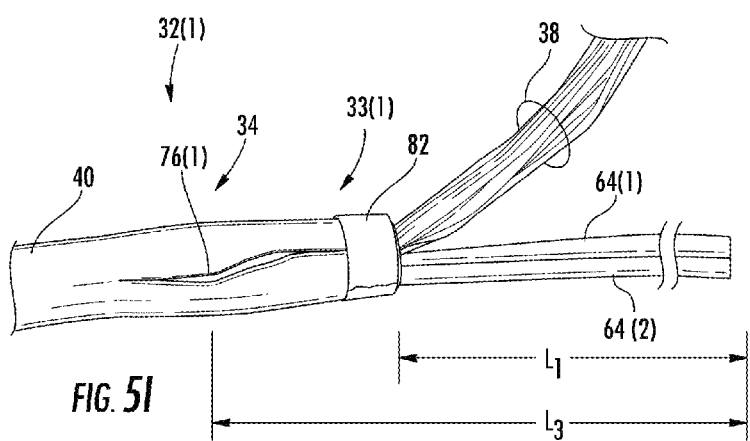
FIG. 5I is a longitudinal side view of the partially assembled fiber optic cable furcation assembly of FIG. 5H illustrating the cable jacket being disposed around the coupling members and tape holding the cable jacket in place.

FIG. 5I is a longitudinal side view of the partially assembled fiber optic cable furcation assembly 32(1) of FIG. 5H illustrating the cable jacket 40 being disposed around the coupling members 54(1), 54(2) and tape 82 being holding the cable jacket 40 in place (Block 72H of FIG. 4). Disposing the cable jacket 40 around the coupling members 54(1), 54(2) enables the coupling members 54(1), 54(2) to be secured to the shrink tubes 52(1), 52(2).

Figure 5J:
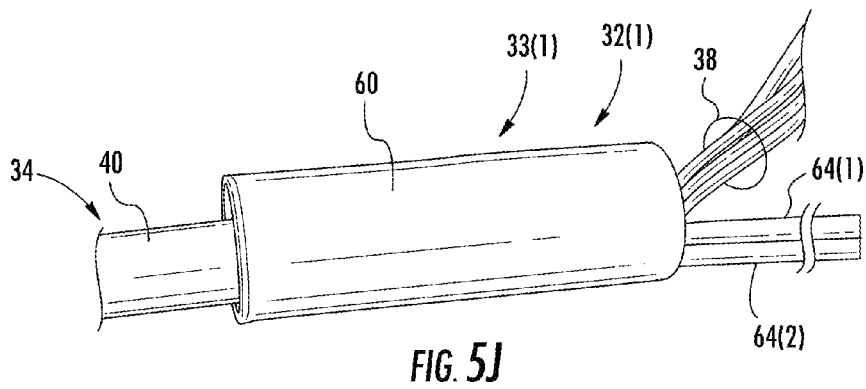
FIG. 5J is a longitudinal side view of the partially assembled fiber optic cable furcation assembly of FIG. 5I illustrating at least one outer shrink tube being disposed around the cable jacket.

Additional strength and performance may be added to the fiber optic cable furcation assembly 32(1) with an application of the outer shrink tube 60. FIG. 5J is a longitudinal side view of the partially assembled fiber optic cable furcation assembly 32(1) of FIG. 5I illustrating the outer shrink tube 60 being disposed around the cable jacket 40 (Block 72I of FIG. 4). The outer shrink tube 60 may have different dimensions than the shrink tubes 52(1), 52(2) but otherwise may be similar and accordingly will not be discussed in further detail.

Figure 5K:
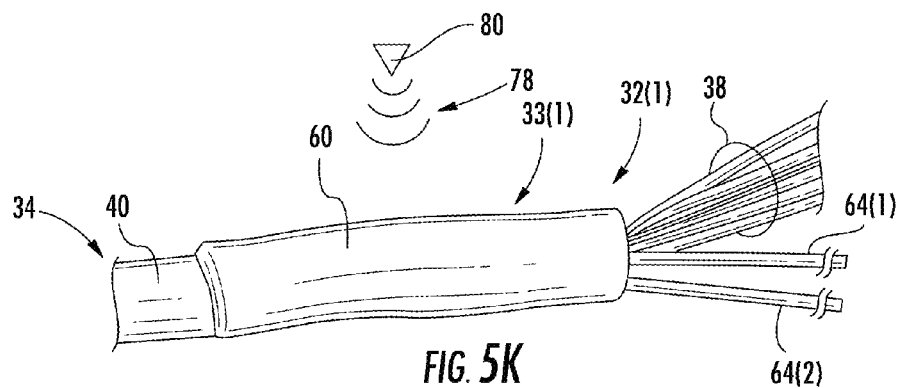
FIG. 5K is a longitudinal side view of the partially assembled fiber optic cable furcation assembly of FIG. 5J illustrating the outer shrink tube being secured to the cable jacket with the application of heat energy to the outer shrink tube.

FIG. 5K is a longitudinal side view of the partially assembled fiber optic cable furcation assembly of FIG. 5J illustrating the outer shrink tube 60 being secured to the fan-out tubes 64(1), 64(2) and the cable jacket 40 with the application of heat energy 78 conveyed from a heat source 80 to the outer shrink tube 60 (Block 72J of FIG. 4). The heat energy 78 may cause the outer shrink tube 60 to tighten and thereby secure the outer shrink tube 60 to the fan-out tubes 64(1), 64(2) and the cable jacket 40. The outer shrink tube 60 may also comprise an adhesive to form a strong bond with the fan-out tubes 64(1), 64(2) and the cable jacket 40. As the outer shrink tube 60 tightens, air is forced out of the fiber optic cable furcation assembly 32(1) thereby reducing or eliminating micro-bubbles which can cause attenuation. Further, the fiber optic cable furcation assembly 32(1) is made smaller after the outer shrink tube 60 tightens and thereby is easier to pull through conduits during installation.

Figure 5L:
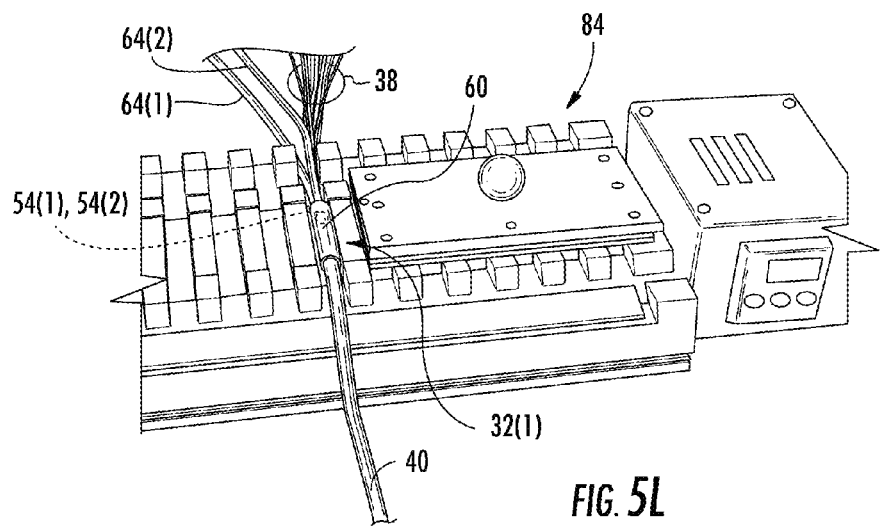
FIG. 5L is a top perspective view of the partially assembled fiber optic cable furcation assembly of FIG. 5K disposed in a heater illustrating the coupling member securing the cable jacket to the shrink tubes, and the strength member.

After the outer shrink tube 60 is secured, the coupling members 54(1), 54(2) may be enabled to provide strength to the fiber optic cable furcation assembly 32(1). FIG. 5L is a top perspective view of the partially assembled fiber optic cable furcation assembly 32(1) of FIG. 5K disposed in a heater 84 illustrating the coupling members 54(1), 54(2) securing the cable jacket 40 to the shrink tubes 52(1), 52(2), and the strength member 38 (Block 72K of FIG. 4). The heater 84 may expose the coupling members 54(1), 54(2) of the fiber optic cable furcation assembly 32(1), for example, to one-hundred fifty (150) degrees Celsius for three (3) minutes to melt the coupling members 54(1), 54(2). Once melted, gravity and capillary action may pull portions of the coupling members 54(1), 54(2) so that the coupling members 54(1), 54(2) may come into contact with the other components of the fiber optic cable furcation assembly 32(1). The coupling members 54(1), 54(2) may be a hot melt adhesive comprising thermoplastic that may be activated by the heat and form bonds during the heating and subsequent cooling to room temperature. In this manner, the shrink tubes 52(1), 52(2) (FIG. 5E) may be secured to the cable jacket 40. Once secured with the coupling members 54(1), 54(2), the fiber optic cable furcation assembly 32(1) may be installed in the fiber optic equipment 50 (FIG. 3) and the optical fibers 36(1), 36(2) terminated, for example, with the fiber optic connectors 86(1), 86(2).

Figure 6:
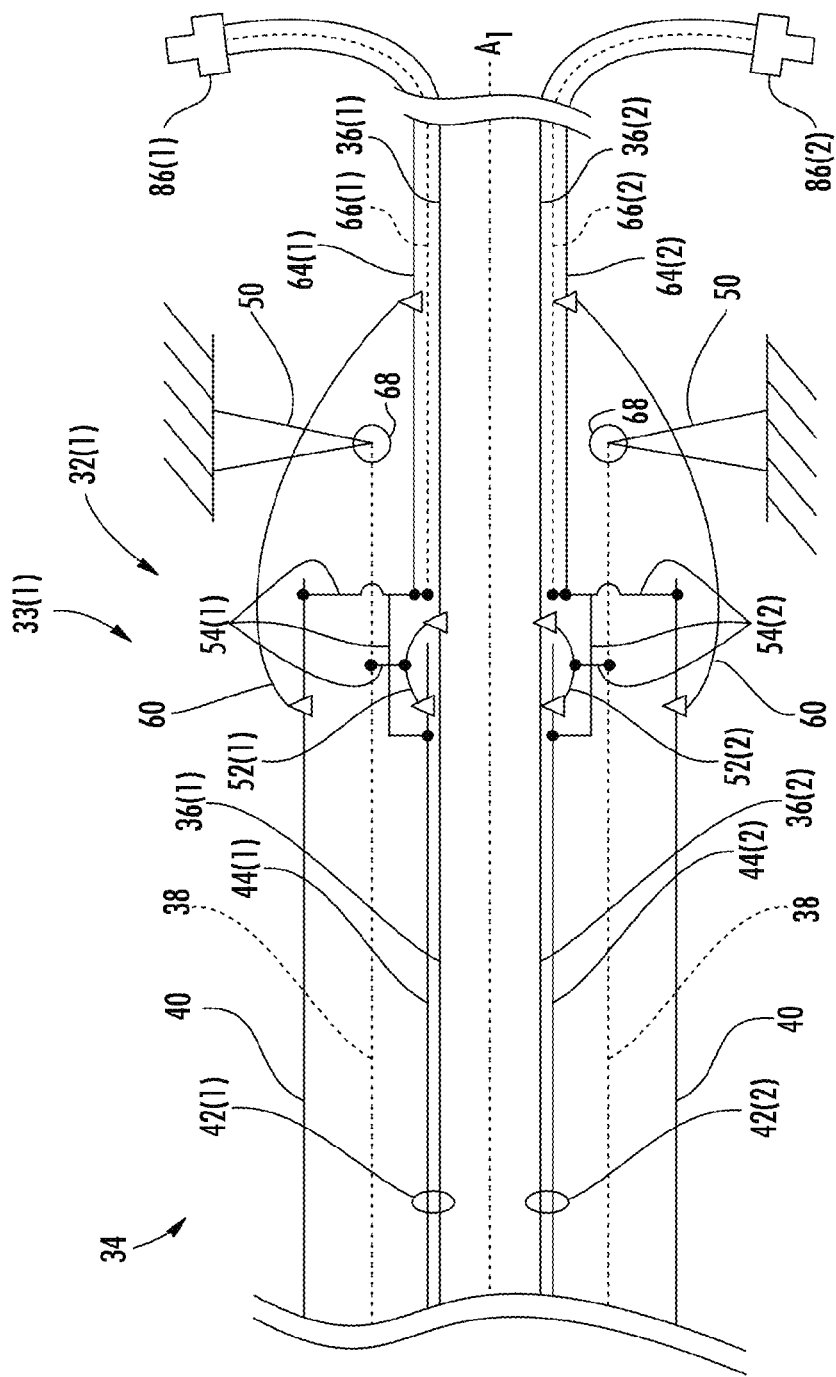
FIG. 6 is a schematic diagram illustrating the exemplary relationships between components of the fiber optic cable furcation of FIG. 2A.

FIG. 6 is a schematic diagram to summarize the exemplary relationships discussed above between the components of the fiber optic cable furcation assembly 32(1). For example, the schematic diagram depicts the fiber optic cable furcation assembly 32(1) secured to the portion 68 of the fiber optic equipment 50 to provide strain relief through the strength member 38. The coupling members 54(1), 54(2) are secured to the cable jacket 40, strength member 38, and the shrink tubes 52(1), 52(2). Because the strength member 38 is attached to the fiber optic equipment 50 to provide strain relief, the coupling members 54(1), 54(2) transfer the cable strain $F_S$ to the strength member 38 from one or more of the cable jacket 40 and the fiber sub-unit jackets 44(1), 44(2). As the strength members 38 are directly coupled to relatively stretchable components, namely the cable jacket 40 and the fiber sub-unit jackets 44(1), 44(2), this enables cable strain to be carried by the strength members 38 and shared by the stretchable components. The cable strain carried by the strength members 38 may be less likely to be shared with the optical fibers 36(1), 36(2), because the optical fibers 36(1), 36(2) are not directly coupled to the strength members 38 and attenuation may be reduced.

Figure 7:
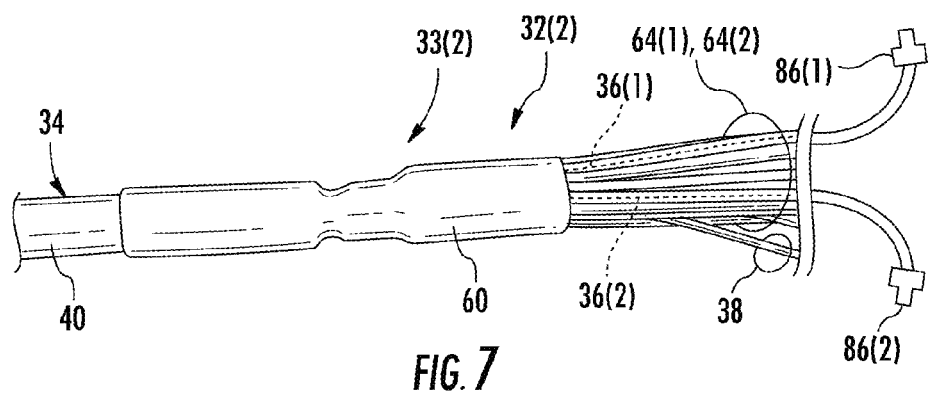
FIG. 7 is a longitudinal side view of another exemplary fiber optic cable furcation assembly including optical fibers of fiber sub-units of a fiber optic cable secured to fiber sub-unit jackets of the fiber sub-units with shrink tubes, the shrink tubes are disposed without direct coupling of the optical fibers to strength members, similar to the fiber optic cable furcation assembly of FIG. 2A, but including fan-out tubes arranged using a wrapping technique.

FIG. 7 introduces another exemplary fiber optic cable furcation assembly 32(2) now that the fiber optic cable furcation assembly 32(1) and the exemplary process 70 for furcating the fiber optic cable 34 have been introduced. The fiber optic cable furcation assembly 32(2) comprises a fiber optic cable 34 and a furcation 33(2) including the shrink tubes 52(1), 52(2) and the coupling members 54(1), 54(2) (not shown). In this regard, FIG. 7 is a longitudinal side view of the fiber optic cable furcation assembly 32(2) including the optical fibers 36(1), 36(2) of the fiber sub-units 42(1), 42(2) of the fiber optic cable 34 secured to the fiber sub-unit jackets 44(1), 44(2) of the fiber sub-units 42(1), 42(2) with the shrink tubes 52(1), 52(2) of the fiber optic cable furcation assembly 32(2). The optical fibers 36(1), 36(2) are without direct coupling to the strength members 38, similar to the fiber optic cable furcation assembly 32(1) of FIG. 2A. However, the fiber optic cable furcation assembly 32(2) includes the fan-out tubes 64(1), 64(2) arranged using a wrapping technique to enable the fiber optic cable furcation assembly 32(2) to fit easier through small conduits.

Figure 8A:
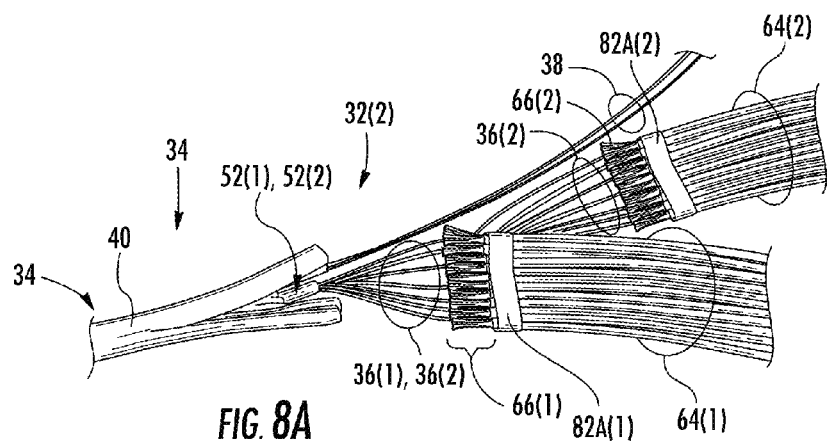
FIG. 8A is a longitudinal side view of the partially assembled fiber optic cable furcation assembly of FIG. 7 illustrating the optical fibers of the partially assembled fiber cable assembly of FIG. 5F being disposed within the fan-out tubes.

In this regard, FIG. 8A is a longitudinal side view of the fiber optic cable furcation assembly 32(2) of FIG. 7 in a partially assembled state of formation to illustrate the optical fibers 36(1), 36(2) being at least partially disposed within the fan-out tubes 64(1), 64(2) (Block 74A of FIG. 4). The fan-out tubes 64(1), 64(2) protect the optical fibers 36(1), 36(2) between the fiber optic cable furcation assembly 32(2) and the fiber optic connectors 86(1), 86(2) (FIG. 7). The fan-out tube strength members 66(1), 66(2) of the fan-out tubes 64(1), 64(2), respectively, may face the coupling members 54(1), 54(2) for securing to the cable jacket 40 as discussed below. It is noted that the fan-out tubes 64(1), 64(2) corresponding to the optical fibers 36(1), 36(2) may have tape 82A(1), 82A(2) applied, respectively, to provide organization and corresponding assembly efficiency.

Figure 8B:
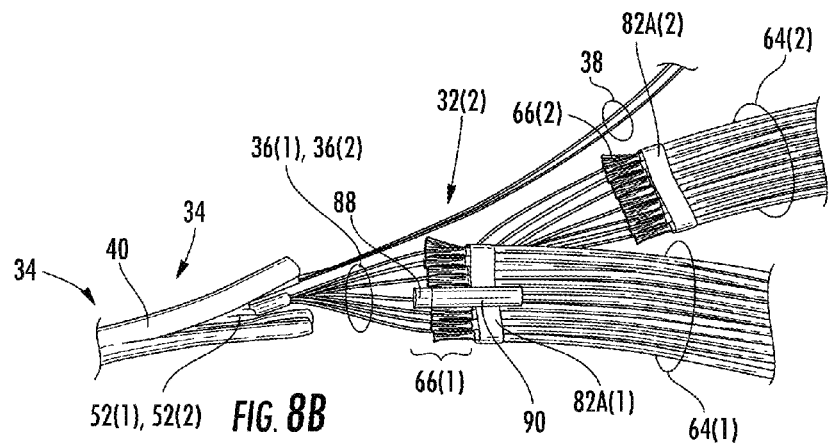
FIG. 8B is a longitudinal side view of the fiber optic cable furcation assembly of FIG. 8A in a partially assembled condition to illustrate a radial holding member being disposed adjacent to one portion of the fan-out tubes associated with one of the fiber sub-units.
Figure 8C:
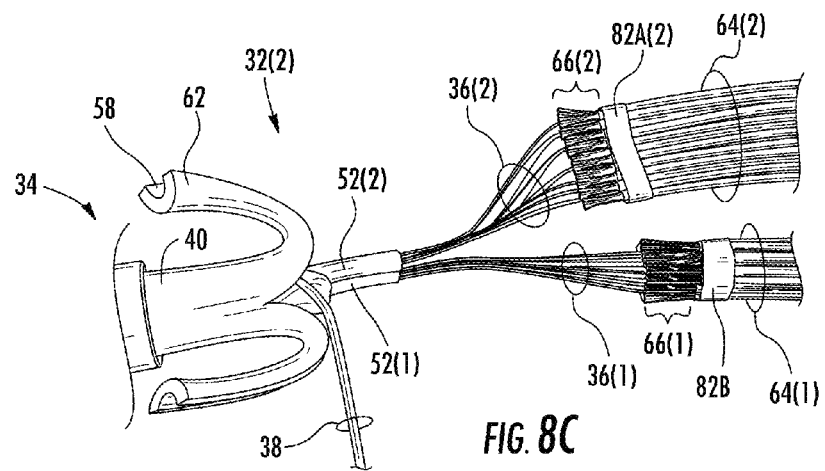
FIG. 8C is a longitudinal side view of the partially assembled fiber optic cable furcation assembly of FIG. 8B illustrating the one portion of the fan-out tubes being wrapped about the radial holding member.

FIGS. 8B and 8C are side views of the fiber optic cable furcation assembly 32(2) of the fiber optic cable 34 depicting that the process 70 may include disposing the fan-out tubes 64(1) adjacent to a radial holding member 88 and adjacent to at least one second securing member 90 (Block 74B of FIG. 4). Specifically, the at least one fan-out tube 64(1) may be placed adjacent to the radial holding member 88 and the second securing member 90 as depicted in FIG. 8B. Moreover, FIG. 8C illustrates the fan-out tubes 64(1) may be wrapped around the radial holding member 88 and the second securing member 90 to provide closer proximity between the second securing member 90 and the fan-out tubes 64(1). As shown further in FIG. 8C, at least one additional piece of tape 82B may hold the at least one fan-out tube 64(1) in a wrapped position around the radial holding member 88 and the second securing member 90.

In this regard, the second securing member 90 may include a cylindrical shape and the radial holding member 88 may be disposed within the second securing member 90. The second securing member 90 may be, for example, a hot melt adhesive comprising thermoplastic configured to bond the fan-out tubes 64(1), 64(2) together with the radial holding member 88. The radial holding member 88 may include a cylindrical shape and may be made of a material compatible with forming a bond to the second securing member 90. In an exemplary embodiment, the second securing member 90 may be, for example, a ThermoGrip® HM7116 hot melt adhesive made by Bostik, Inc. of Wauwatosa, Wis.

Figure 8D:
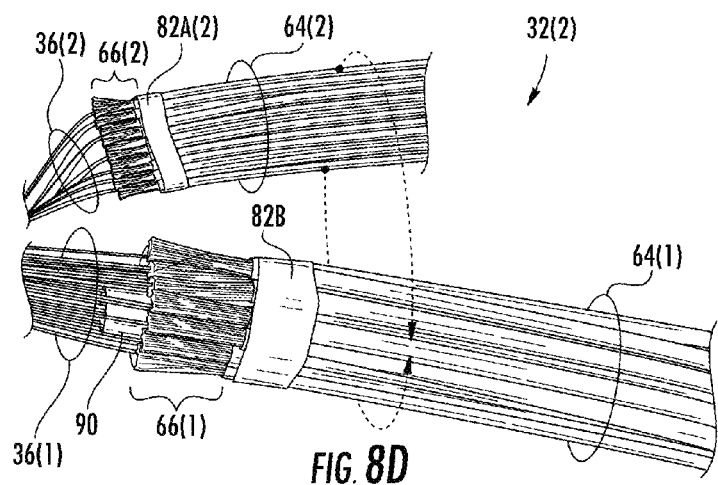
FIG. 8D is a longitudinal side view of the partially assembled fiber optic cable furcation assembly of FIG. 8C illustrating a second portion of the fan-out tubes being wrapped about the one portion of the fan-out tube.
Figure 8E:
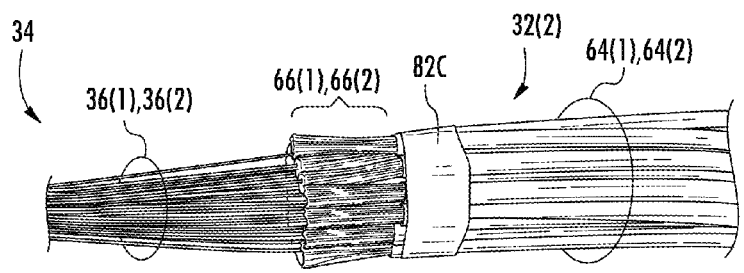
FIG. 8E is a longitudinal side view of the partially assembled fiber optic cable furcation assembly of FIG. 8D illustrating the second portion of the at least one fan-out tube wrapped about the one portion of the fan-out tubes.

FIGS. 8D and 8E are longitudinal side views of the partially assembled fiber optic cable furcation assembly 32(2) of FIG. 8C depicting the fan-out tubes 64(2) being wrapped around the fan-out tubes 64(1) and securing with tape 82C (Block 74C of FIG. 4). Wrapping the at least one fan-out tube 64(2) enables a relatively compact structure which may be more easily bonded together with the second securing member 90. The resulting relatively compact structure may also be more easily pulled through conduits during installation at facilities having the fiber optic equipment 50 (FIG. 3).

Figure 8F:
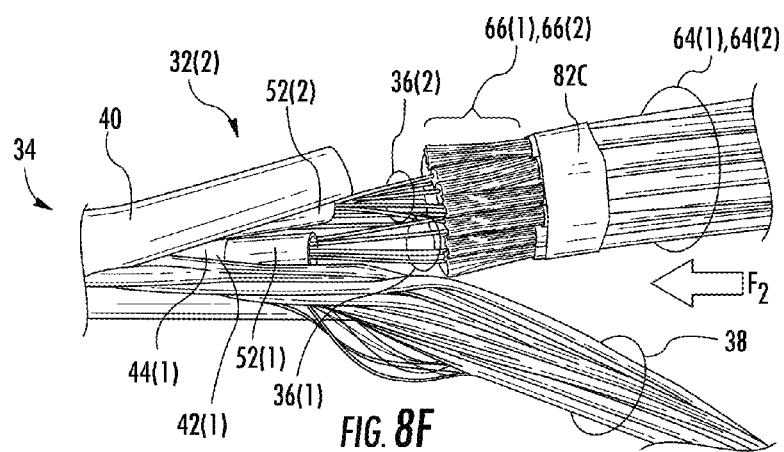
FIG. 8F is a longitudinal side view of the partially assembled fiber optic cable furcation assembly of FIG. 8E illustrating the fan-out tubes being further disposed around the optical fibers.
Figure 8G:
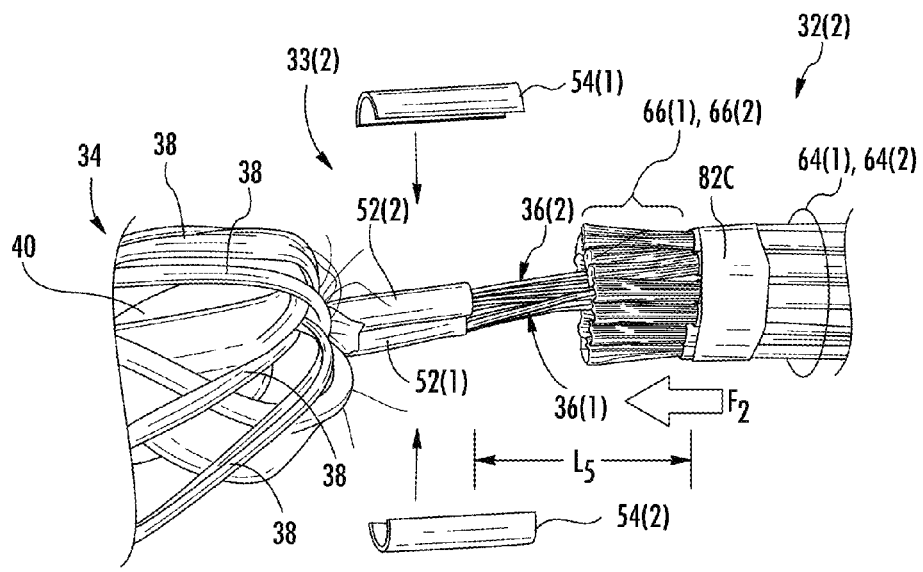
FIG. 8G is a longitudinal side view of the partially assembled fiber optic cable furcation assembly of FIG. 8F illustrating the at least one coupling member being disposed around the shrink tubes.

FIGS. 8F and 8G are longitudinal side views of the partially assembled fiber optic cable furcation assembly 32(2) of FIG. 8E illustrating the fan-out tubes 64(1), 64(2) being further disposed around the optical fibers 36(1), 36(2) with the force $F_2$ as the strength members 38 are pulled back to enable the coupling members 54(1), 54(2) to be precisely disposed around the shrink tubes 52(1), 52(2), respectively (Block 74D of FIG. 4).

Figure 8H:
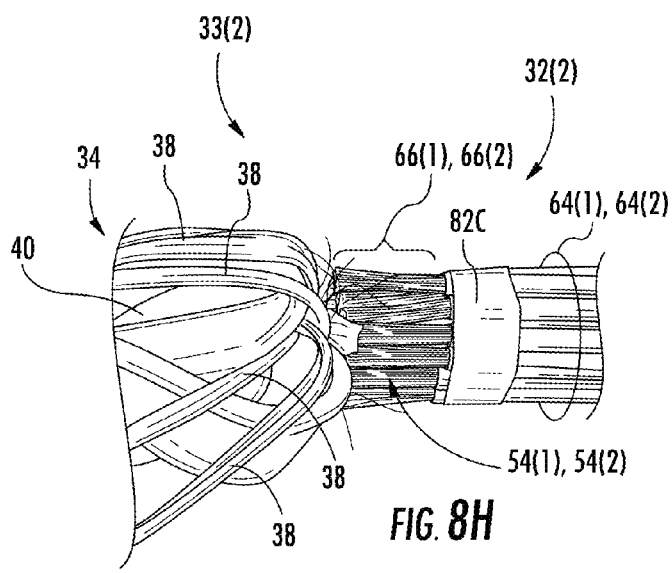
FIG. 8H is a longitudinal side view of the partially assembled fiber optic cable furcation assembly of FIG. 8G illustrating the fan-out tubes being disposed adjacent to the shrink tubes.

FIG. 8H is a longitudinal side view of the partially assembled fiber optic cable furcation assembly 32(2) of FIG. 8G illustrating the fan-out tubes 64(1), 64(2) being disposed adjacent to the shrink tubes 52(1), 52(2) (Block 74E of FIG. 4). In order for the fan-out tubes 64(1), 64(2) to be adjacent to the shrink tubes 52(1), 52(2), the fan-out tubes 64(1), 64(2) are disposed further around the optical fibers 36(1), 36(2) so that, for example, a distance $L_5$ (FIG. 8G) is traversed to dispose the fan-out tube strength members 66(1), 66(2) in close proximity to the coupling members 54(1), 54(2). In this regard, the fan-out tube strength members 66(1), 66(2) may be secured to the cable jacket 40 with the coupling members 54(1), 54(2).

Figure 1:
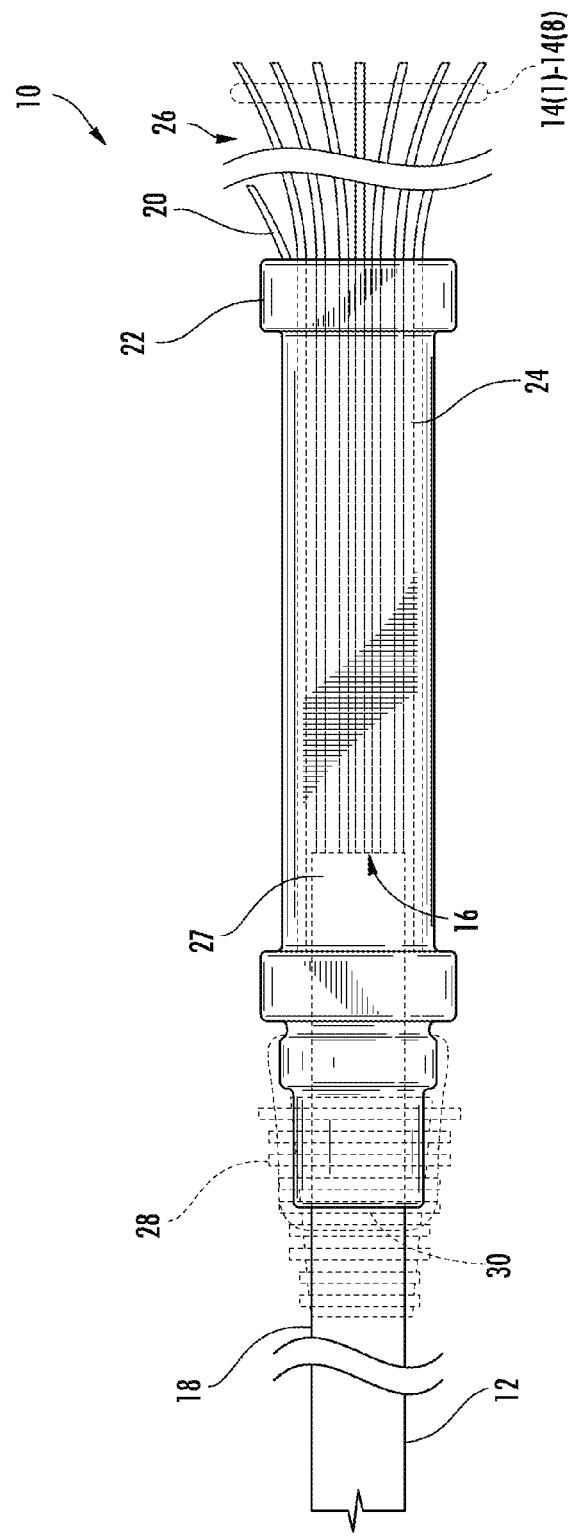
FIG. 1 is a longitudinal side view of a conventional fiber optic cable furcation assembly illustrating end portions of optical fibers extending out from a fiber optic cable jacket and furcated in a furcation body with a potting compound.
Figures 1, 8I:
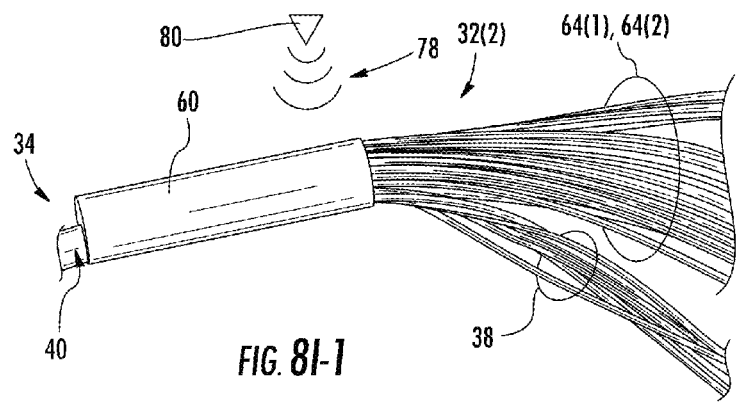

FIG. 8I-1 is a longitudinal side view of the partially assembled fiber optic cable furcation assembly 32(2) of FIG. 8H illustrating the outer shrink tube 60 being disposed over the fan-out tubes 64(1), 64(2), the strength members 38, and the cable jacket 40. Heat energy 78 from a heat source 80 is applied to secure the outer shrink tube 60 to the fan-out tubes 64(1), 64(2) and the cable jacket 40. In this regard, the outer shrink tube 60 provides protection to the fiber optic cable furcation assembly 32(2) by sealing the fiber optic cable furcation assembly 32(2) against changes in humidity or temperature which may cause attenuation. Further, the outer shrink tube 60 constricts around the fan-out tubes 64(1), 64(2) and the cable jacket 40 as the heat energy 78 is applied, which eliminates or reduces air pockets within the fiber optic cable furcation assembly 32(2) which can result in air bubbles causing attenuation.

Figures 2, 8I:
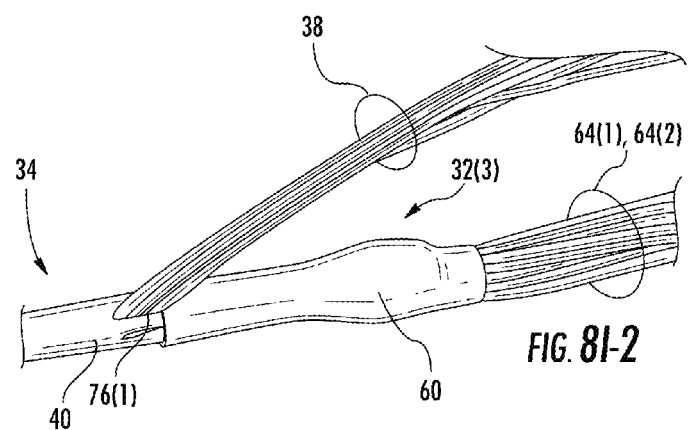

FIG. 8I-2 is a side view of another embodiment of a fiber optic cable furcation assembly 32(3) illustrating the strength members 38 exiting from the split cut 76(1) in the cable jacket 40 and the outer shrink tube 60 secured around the partially assembled fiber optic cable furcation of FIG. 8H. In this manner, the strength members 38 may be secured outside the outer shrink tube 60 to complete the furcation and add flexibility to customize the fiber optic cable furcation assembly 32(3) for specific installation challenges.

Figure 8J:
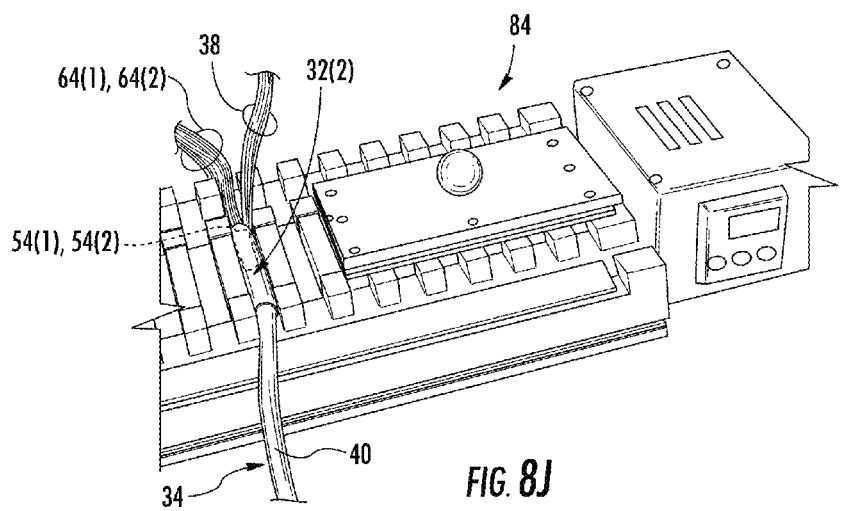
FIG. 8J is a top perspective view of the partially assembled fiber optic cable furcation assembly of FIG. 8I-1 disposed in a heater to illustrate the coupling member securing the cable jacket to the optical fibers, the shrink tubes, and the fan-out tubes.
Figure 8K:
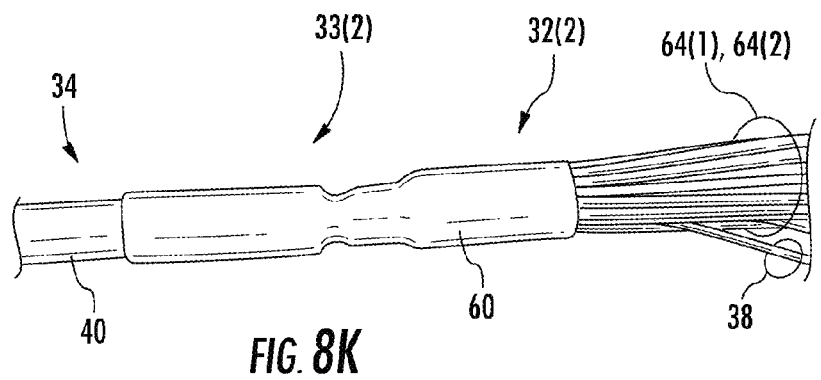
FIG. 8K is a side view of the completed fiber optic cable furcation after removal from the heater of FIG. 8J.

FIG. 8J is a top perspective view of the partially assembled fiber optic cable furcation assembly of FIG. 8I-1 disposed in a heater 84 to illustrate the coupling members 54(1), 54(2) melting and thereby securing the cable jacket 40 to the shrink tubes 52(1), 52(2), the strength members 38, and the fan-out tubes 64(1), 64(2) (Block 74F of FIG. 4). It is also noted that the second securing member 90 may also bond the radial holding member 88 with the fan-out tubes 64(1), 64(2). The heater 84 may heat the coupling members 54(1), 54(2) and the second securing member 90 of the fiber optic cable furcation assembly 32(2), for example, to one-hundred fifty (150) degrees Celsius for three (3) minutes to melt the coupling members 54(1), 54(2). The coupling members 54(1), 54(2) and second securing member 90 may be hot melt adhesives comprising thermoplastic that may be activated by the heat and later form bonds during the heating and subsequent cooling to room temperature. In this manner, once the bonds are formed with the coupling members 54(1), 54(2) and the second securing member 90, then the fiber optic cable furcation assembly 32(2) as depicted in FIG. 8K may be installed in the fiber optic equipment 50 (FIG. 3) and the optical fibers 36(1), 36(2) terminated. The optical fibers 36(1), 36(2) may be terminated with the fiber optic connectors 86(1), 86(2) (FIG. 7). In this manner, the fan-out tubes 64(1), 64(2) may protect the optical fibers 36(1), 36(2) exiting from the cable jacket 40 in a compact configuration.

Figure 9:
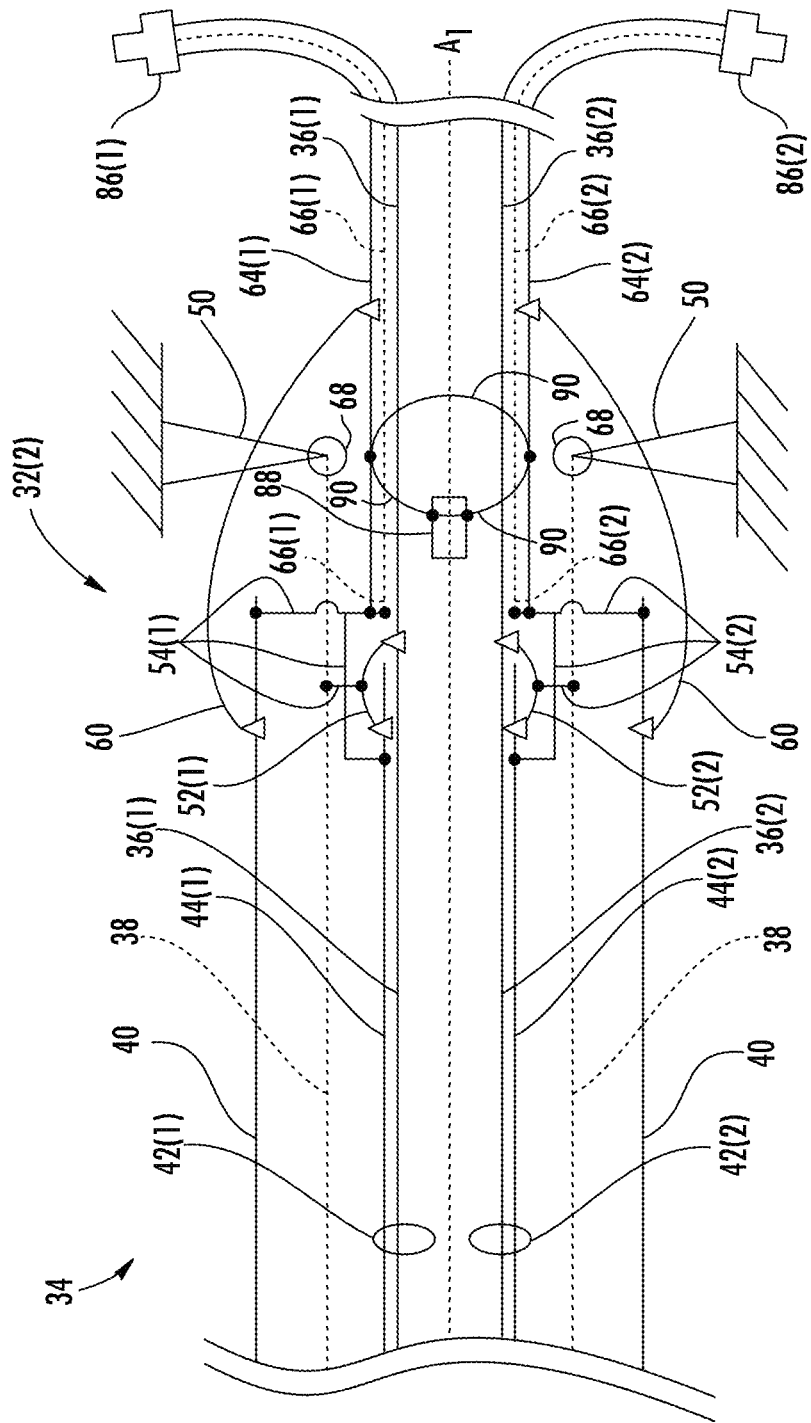
FIG. 9 is a schematic diagram of the fiber optic cable furcation assembly of FIG. 8K with the strength members providing strain relief to the fiber optic cable by being attached to fiber optic equipment and the optical fibers having fiber optic connectors installed and ready for termination.

To summarize interconnections of the fiber optic cable furcation assembly 32(2), FIG. 9 is a schematic diagram of the fiber optic cable furcation assembly 32(2) secured to the portion 68 of the fiber optic equipment 50 to provide strain relief through the strength member 38. The schematic diagram depicted in FIG. 9 for the fiber optic cable furcation assembly 32(2) may be similar to the schematic diagram depicted in FIG. 6 for the fiber optic cable furcation assembly 32(1) and so only the differences will be discussed for clarity and conciseness. Consistent with this concise approach, FIG. 9 depicts that the fiber optic cable furcation assembly 32(2) may include the coupling members 54(1), 54(2) bonded to the fan-out tube strength members 66(1), 66(2). In this manner, the fan-out tubes 64(1), 64(2) may be securely attached as part of the fiber optic cable furcation assembly 32(2). The outer shrink tube 60 may secured to the cable jacket 40 and the fan-out tubes 64(1), 64(2) to provide additional strength to the fiber optic cable furcation assembly 32(2) and seal the fiber optic cable furcation assembly 32(2) against temperature or humidity. The second securing member 90 may bond the radial holding member 88 and the fan-out tubes 64(1), 64(2) together to provide strain relief to the fan-out tube strength member 66(1), 66(2). It is noted that the fiber optic cable furcation assembly 32(2) may include the fan-out tube strength members 66(1), 66(2) which may be attached to the coupling members 54(1), 54(2) to further protect the optical fibers 36(1), 36(2) from strain as they exit the cable jacket 40.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structures in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. Non-limiting examples of bend-insensitive, or bend resistant, optical fibers are ClearCurve® Multimode or single-mode fibers commercially available from Corning Incorporated. Suitable fibers of these types are disclosed, for example, in U.S. Patent Application Publication Nos. 2008/0166094 and 2009/0169163, the disclosures of which are incorporated herein by reference in their entireties.

Many modifications and other variations of the embodiments set forth herein will come to mind to one skilled in the art to which the embodiments pertain having the benefit of the teachings presented in the foregoing descriptions and the associated drawings.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

I claim:

1. A method of furcating a fiber optic cable, comprising:
    exposing an end portion of at least one fiber sub-unit and an end portion of at least one strength member from a cable jacket of a fiber optic cable;
    exposing an end portion of at least one optical fiber from an end portion of at least one fiber sub-unit jacket of the at least one fiber sub-unit;
    securing the end portion of the at least one optical fiber to the at least one fiber sub-unit jacket with at least one shrink tube; and
    securing the at least one shrink tube securing the at least one optical fiber to the at least one fiber sub-unit jacket, and the at least one strength member to the cable jacket with at least one coupling member to furcate the fiber optic cable without direct coupling of the at least one strength member to the at least one optical fiber.

2. The method of claim 1, wherein securing the at least one shrink tube comprises heat shrinking the at least one shrink tube to secure the end portion of the at least one optical fiber to the at least one fiber sub-unit jacket.

3. The method of claim 1, further comprising disposing at least one fan-out tube at least partially around the end portion of the at least one optical fiber and adjacent to the at least one shrink tube.

4. The method of claim 3, further comprising securing the at least one fan-out tube to the cable jacket with the at least one coupling member.

5. The method of claim 4, further comprising coupling at least one fan-out strength member of the at least one fan-out tube to the cable jacket with the at least one coupling member.

6. The method of claim 5, further comprising securing the at least one fan-out tube to an outer surface of the cable jacket with at least one outer shrink tube.

7. The method of claim 6, further comprising disposing the at least one fan-out tube adjacent to a radial holding member and adjacent to at least one second coupling member.

8. The method of claim 7, further comprising heating the at least one second coupling member to secure the at least one fan-out tube to the radial holding member.

9. The method of claim 4, further comprising abutting the at least one fan-out tube against the at least one shrink tube.

10. The method of claim 1, further comprising coupling at least one strength member of the fiber optic cable to an inner surface of the cable jacket with the at least one coupling member.

11. The method of claim 1, further comprising disposing an extra fiber length (EFL) portion of the at least one optical fiber within the at least one fiber sub-unit jacket.

12. The method of claim 11, comprising securing the at least one shrink tube to the at least one optical fiber and the at least one fiber sub-unit jacket to maintain the extra fiber length portion of the at least one optical fiber within the at least one fiber sub-unit jacket.

13. The method of claim 1, wherein the securing the at least one shrink tube to the cable jacket of the fiber optic cable comprises heating the at least one coupling member to bond with the at least one shrink tube and the cable jacket.

14. The method of claim 1, wherein the at least one coupling member is comprised of a hot melt adhesive.

15. The method of claim 1, wherein the exposing the end portion of the at least one fiber sub-unit and the end portion of the at least one strength member comprises stripping and splitting the cable jacket.

16. A fiber optic cable furcation assembly, comprising:
a fiber optic cable, comprising:
a cable jacket;
at least one strength member; and
an end portion of at least one fiber sub-unit, the end portion of the at least one fiber sub-unit comprising an end portion of at least one optical fiber extending from at least one fiber sub-unit jacket of the at least one fiber sub-unit; and
a furcation provided on an end portion of the fiber optic cable, the furcation comprising:
at least one shrink tube securing the end portion of the at least one optical fiber to the at least one fiber sub-unit jacket; and
at least one coupling member securing the at least one shrink tube securing the at least one optical fiber to the at least one fiber sub-unit jacket, and the at least one strength member to the cable jacket to establish the furcation of the fiber optic cable without direct coupling of the at least one strength member to the at least one optical fiber.

17. The fiber optic cable furcation assembly of claim 16, wherein the end portion of the at least one optical fiber is at least partially disposed within the cable jacket.

18. The fiber optic cable furcation assembly of claim 16, further comprising at least one fan-out tube at least partially disposed around the end portion of the at least one optical fiber and adjacent to the at least one shrink tube.

19. The fiber optic cable furcation assembly of claim 18, wherein the at least one coupling member secures the at least one fan-out tube to the cable jacket.

20. The fiber optic cable furcation assembly of claim 19, further comprising at least one fan-out strength member of the at least one fan-out tube secured to an inner surface of the cable jacket with the at least one coupling member.

21. The fiber optic cable furcation assembly of claim 20, further comprising at least one outer shrink tube securing the at least one fan-out tube to an outer surface of the cable jacket.

22. The fiber optic cable furcation assembly of claim 20, further comprising at least one second coupling member securing a radial holding member to the at least one fan-out tube.

23. The fiber optic cable furcation assembly of claim 20, wherein the at least one strength member is secured to the inner surface of the cable jacket with the at least one coupling member.

24. The fiber optic cable furcation assembly of claim 16, wherein the at least one optical fiber within the fiber sub-unit jacket and adjacent to the at least one shrink tube is free from tension.

25. The fiber optic cable furcation assembly of claim 16, wherein the at least one coupling member is comprised of a hot melt adhesive.

26. The fiber optic cable furcation assembly of claim 16, wherein the at least one optical fiber is free from abutment with the at least one coupling member.

27. A fiber optic cable furcation assembly, comprising:
a fiber optic cable, comprising:
a cable jacket;
at least one strength member; and
an end portion of at least one fiber sub-unit, the end portion of the at least one fiber sub-unit comprising an end portion of at least one optical fiber extending from at least one fiber sub-unit jacket of the at least one fiber sub-unit; and
a furcation provided on an end portion of the fiber optic cable, the furcation comprising:
at least one shrink tube securing the end portion of the at least one optical fiber to the at least one fiber sub-unit jacket;
at least one fan-out tube disposed at least partially around the at least one optical fiber and abutting against the at least one shrink tube;
at least one coupling member securing the at least one fan-out tube, the at least one shrink tube securing the at least one optical fiber to the at least one fiber sub-unit jacket, and the at least one strength member to the cable jacket to establish the furcation of the fiber optic cable without direct coupling of the at least one strength member to the at least one optical fiber,
wherein the at least one coupling member is comprised of a hot melt adhesive.

* * * * *